US012644968B2

(12) United States Patent
Mielke et al.

(10) Patent No.: US 12,644,968 B2
(45) Date of Patent: Jun. 2, 2026

(54) LIDAR SYSTEM WITH DYNAMIC SCAN SPEED

(71) Applicant: Luminar Technologies, Inc., Orlando, FL (US)

(72) Inventors: Stephen L. Mielke, Oviedo, FL (US); Christopher Gary Sentelle, Orlando, FL (US)

(73) Assignee: Microvision, Inc., Redmond, WA (US)

( * ) Notice: Subject to any disclaimer, the term of this patent is extended or adjusted under 35 U.S.C. 154(b) by 809 days.

(21) Appl. No.: 18/073,714

(22) Filed: Dec. 2, 2022

(65) Prior Publication Data

US 2023/0176198 A1     Jun. 8, 2023

Related U.S. Application Data

(60) Provisional application No. 63/285,653, filed on Dec. 3, 2021.

(51) Int. Cl.
| | |
|---|---|
| *G01S 17/89* | (2020.01) |
| *G01S 7/481* | (2006.01) |
| *G01S 17/931* | (2020.01) |
| *G02B 26/12* | (2006.01) |

(52) U.S. Cl.
CPC .......... *G01S 7/4817* (2013.01); *G01S 17/931* (2020.01); *G02B 26/122* (2013.01); *G02B 26/127* (2013.01); *G02B 26/129* (2013.01)

(58) Field of Classification Search
CPC .... G01S 7/4817; G01S 17/931; G01S 7/4815; G01S 7/497; G01S 17/10; G01S 17/04; G02B 26/122; G02B 26/127; G02B 26/129
See application file for complete search history.

(56) References Cited

U.S. PATENT DOCUMENTS

| | | | | |
|---|---|---|---|---|
| 10,324,170 | B1 * | 6/2019 | Engberg, Jr. .......... | G01S 7/4818 |
| 10,401,480 | B1 * | 9/2019 | Gaalema ............... | G01S 17/931 |
| 2018/0239021 | A1 * | 8/2018 | Akselrod ............... | H04N 23/54 |
| 2020/0292709 | A1 * | 9/2020 | Eshel .................... | G01S 7/4815 |
| 2021/0373128 | A1 * | 12/2021 | Wang .................... | G01S 7/4817 |

FOREIGN PATENT DOCUMENTS

| | | | | |
|---|---|---|---|---|
| CA | 2038924 C | * | 8/1998 | .......... G01S 7/4817 |

* cited by examiner

*Primary Examiner* — Assres H Woldemaryam
(74) *Attorney, Agent, or Firm* — Kevin D. Wills

(57) ABSTRACT

In one embodiment, a lidar system includes a light source configured to emit a first set of optical signals that include a first optical signal. The lidar system also includes a scanner that includes a polygon mirror configured to: rotate around an axis of rotation at a rotation rate, and direct the first set of emitted optical signals into a field of regard of the lidar system with the polygon mirror rotating at a first rotation rate. The lidar system further includes a receiver configured to detect a first received optical signal that includes a portion of the first optical signal that is scattered by a target located a distance from the lidar system. The lidar system also includes a controller configured to adjust the rotation rate of the polygon mirror for a second set of optical signals emitted by the light source.

20 Claims, 16 Drawing Sheets

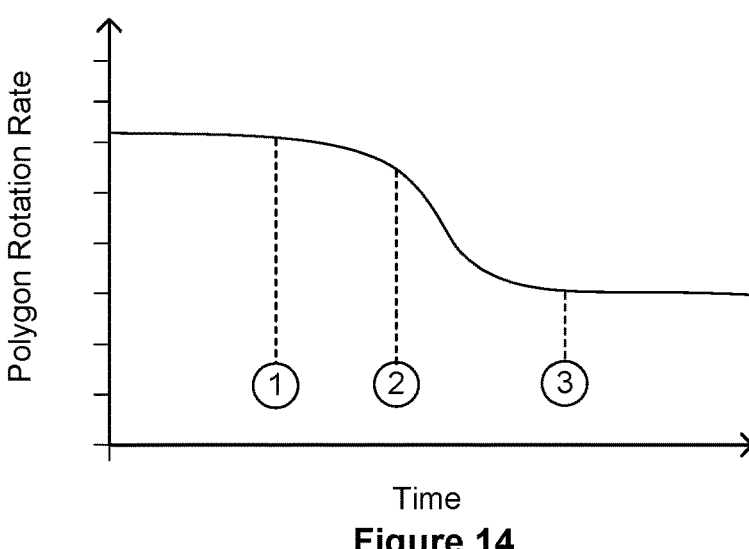
Figure 14
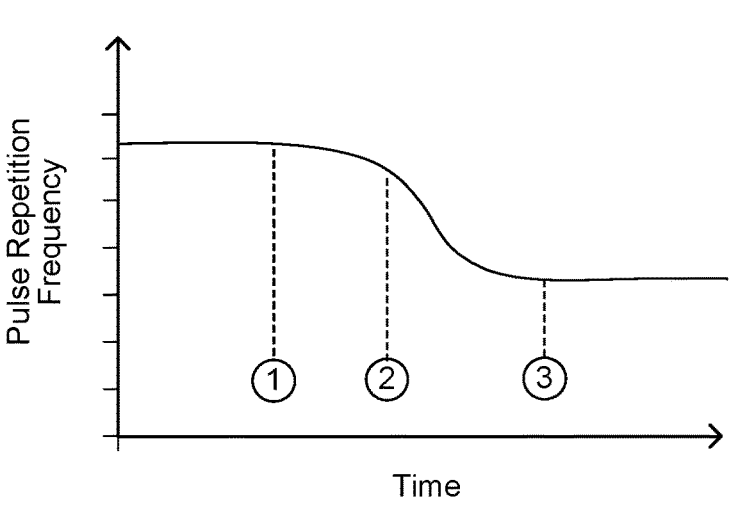
Figure 15
Figure 16

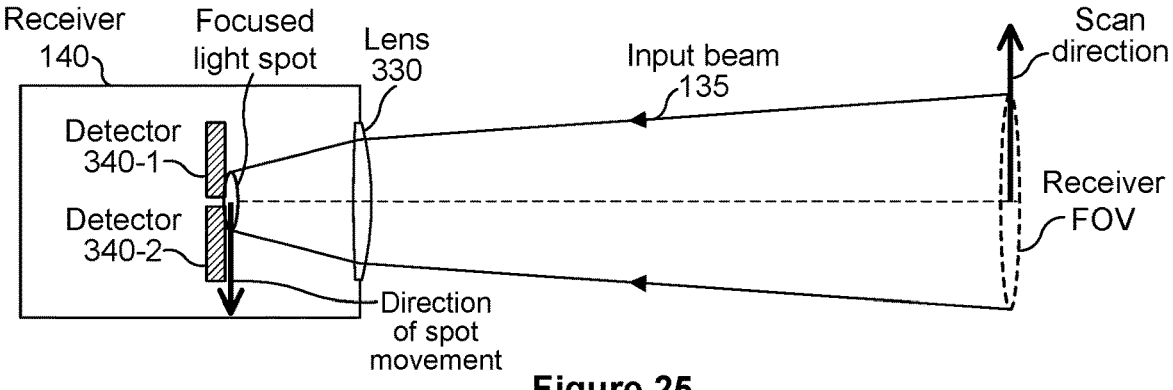
Figure 25
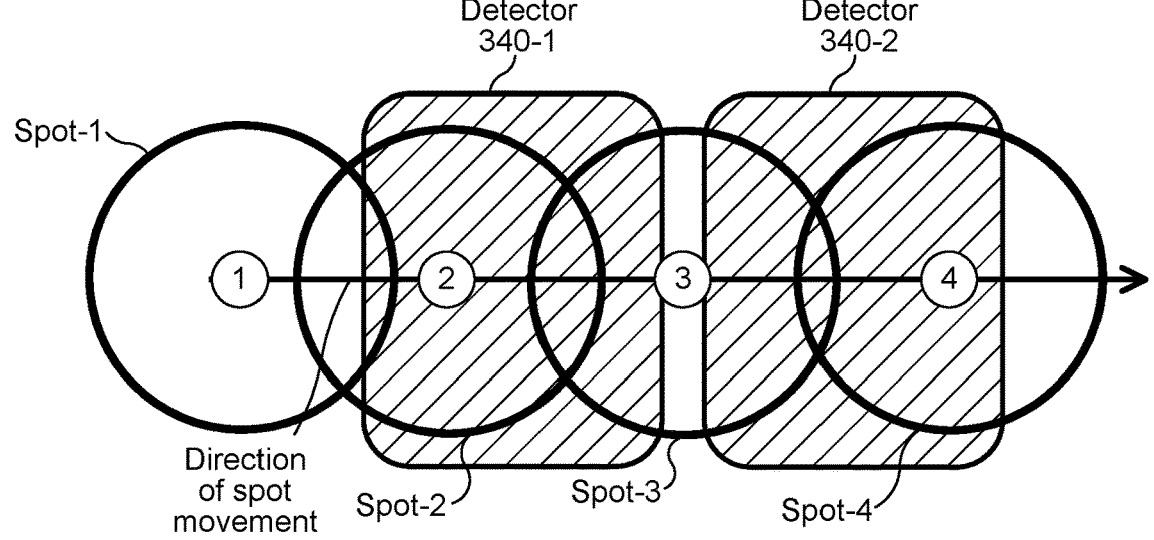
Figure 26
Figure 27

LIDAR SYSTEM WITH DYNAMIC SCAN SPEED

CROSS-REFERENCE TO RELATED APPLICATIONS

This application claims the benefit of U.S. Provisional Patent Application No. 63/285,653, filed 3 Dec. 2021, which is incorporated by reference herein in its entirety.

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

BRIEF DESCRIPTION OF THE DRAWINGS

FIGS. 14-16 illustrate example graphs of polygon rotation rate, operating range, and pulse repetition frequency plotted versus time.

FIG. 25 illustrates an example receiver with two detectors.

FIG. 26 illustrates four example spots of light received from a fixed distance target, superimposed onto two example detectors.

FIG. 27 illustrates example signals produced by the detectors of FIG. 26 as a function of polygon rotation speed.

DESCRIPTION OF EXAMPLE EMBODIMENTS

Figure 1:
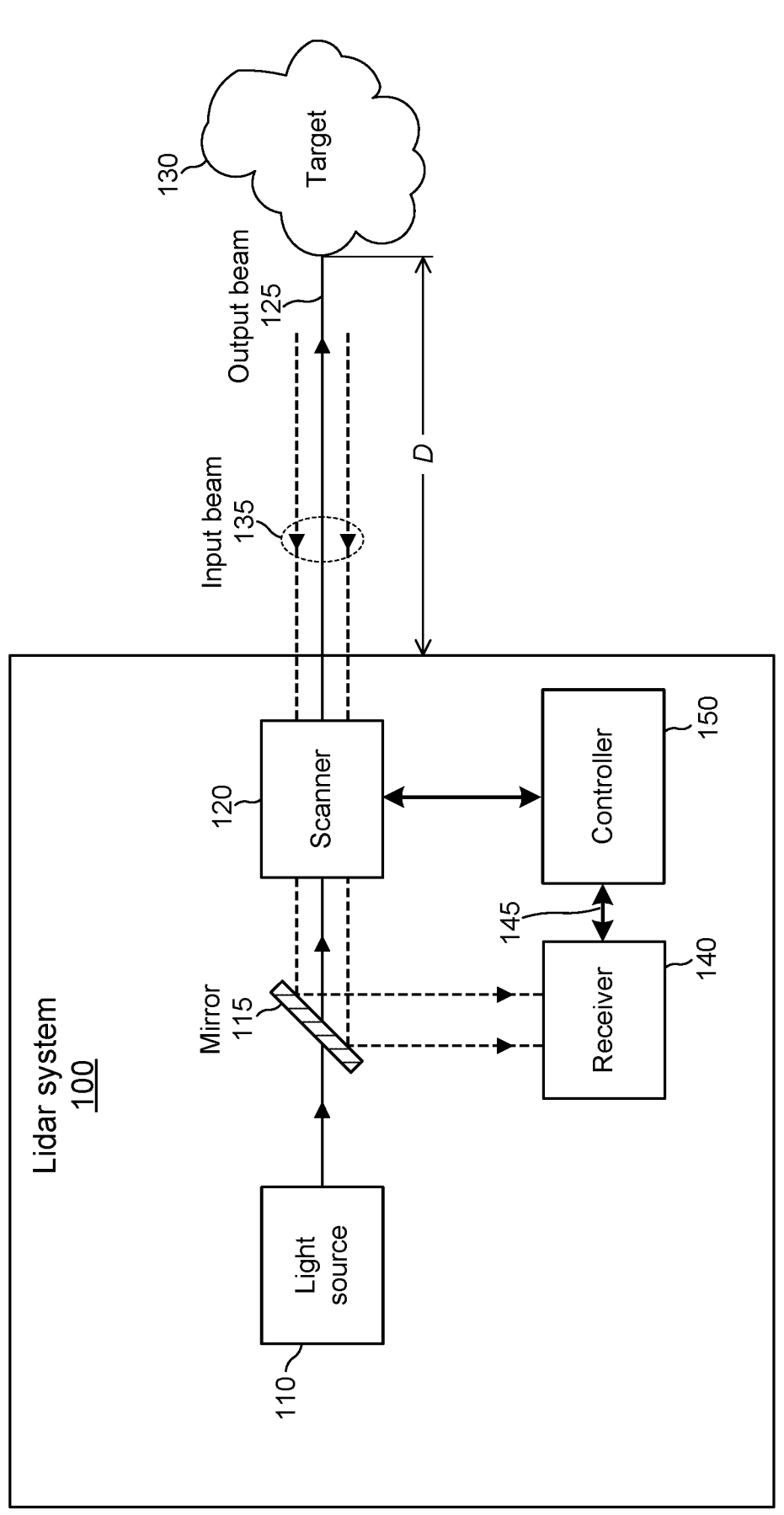
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150 (which may be referred to as a processor). The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, output light, emitted pulse of light, laser beam, light beam, optical beam, emitted beam, transmitted beam of light, emitted light, or beam. In particular embodiments, input beam 135 may include or may be referred to as a received optical signal, received pulse of light, input pulse of light, input optical signal, return beam, received beam, received beam of light, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative electrical signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T may represent a round-trip time of flight for an emitted pulse of light to travel from the lidar system 100 to the target 130 and back to the lidar system 100), then the distance D from the target 130 to the lidar system 100 may be expressed as $D=c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses of light with a pulse duration of approximately 1-5 ns. As another example, light source 110 may be a pulsed laser that produces pulses of light at a pulse repetition frequency of approximately 100 kHz to 10 MHz or a pulse period (e.g., a time between consecutive pulses of light) of approximately 100 ns to 10 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate or pulse repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power $(P_{peak})$ of a pulse of light can be related to the pulse energy (E) by the expression $E=P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power $(P_{av})$ of an output beam 125 can be related to the pulse repetition frequency (PRF) and pulse energy by the expression $P_{av}=PRF \cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., band-pass or interference filters), beam splitters, optical splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photo-detector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a Θ-degree rotation by a scanning mirror results in a 2Θ-degree angular scan of output beam 125).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counter-clockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz). In some embodiments, the motor may be configured to rotate the polygon mirror at a variable or adjustable rotation frequency.

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is different from the first direction (e.g., the first and second directions may be approximately orthogonal to one another, or the second direction may be oriented at any suitable non-zero angle with respect to the first direction). As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20°

FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an approximately orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may include or may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may receive an input beam 135 that includes an optical pulse, and the detector may produce a pulse of electrical current that corresponds to the received optical pulse. A detector may have an active region or an avalanche-multiplication region that includes silicon, germanium, InGaAs, indium aluminum arsenide (InAlAs), InAsSb (indium arsenide antimonide), AlAsSb (aluminum arsenide antimonide), AlInAsSb (aluminum indium arsenide antimonide), or silicon germanium (SiGe). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a photocurrent (e.g., a pulse of current produced by an APD in response to a received optical pulse) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection. In particular embodiments, controller 150 may be electrically coupled or communicatively coupled to scanner 120. As an example, controller 150 may provide instructions, a control signal, or a trigger signal to scanner 120 to control motion characteristics of any scanning mirrors. As another example, controller 150 may provide instructions, a control signal, or a trigger signal to scanner 120 indicating the rate at which to rotate a polygon mirror within the scanner 120. In particular embodiments, the rotation rate may be adjusted based on instructions, a control signal, or trigger pulses provided by controller 150.

The technique of adjusting the rotation rate of a polygon mirror may be applied to any suitable lidar system, such as a one-eye lidar system 100, or a two-eye lidar system 101.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time τ between the emission of successive optical signals by the expression $R_{OP}=c·τ/2$. In other embodiments, the operating range $R_{OP}$ of a lidar system 100 may be related to the rotation rate of the polygon mirror 310, or the characteristics of the detector 340. For a lidar system 100 with a 200-m operating range ($R_{OP}=200$ m), the time τ between successive pulses (which may be referred to as a pulse period, a pulse repetition interval (PRI), or a time period between pulses) is approximately $2·R_{OP}/c≅1.33$ μs. The pulse period τ may also correspond to the time of flight for a pulse to travel to and from a target 130 located a distance $R_{OP}$ from the lidar system 100. Additionally, the pulse period τ may be related to the pulse repetition frequency (PRF) by the expression $τ=1/PRF$. For example, a pulse period of 1.33 μs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5×10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, a truck may include a single lidar system 100 with a 60-degree to 180-degree horizontal FOR directed towards the front of the truck. As another example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include a car used for work, commuting, running errands, or transporting people. As another example, a vehicle may include a truck used to transport commercial goods to a store, warehouse, or residence. A vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., a drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering mechanism, accelerator, brakes, lights, or turn signals). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, an emitted optical signal, or emitted light) may include pulses of light, CW light, amplitude-modulated light, frequency-modulated (FM) light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 that produces pulses of light. Alternatively, a lidar system 100 may be configured to operate as a frequency-modulated continuous-wave (FMCW) lidar system and may include a light source 110 that produces CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined based on the round-trip time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a frequency of received light (which includes emitted light scattered by the remote target) relative to a frequency of local-oscillator (LO) light. A round-trip time for the emitted light to travel to a target 130 and back to the lidar system may correspond to a frequency difference between the received scattered light and the LO light. A larger frequency difference may correspond to a longer round-trip time and a greater distance to the target 130.

A light source 110 for a FMCW lidar system may include (i) a direct-emitter laser diode, (ii) a seed laser diode followed by a SOA, (iii) a seed laser diode followed by a fiber-optic amplifier, or (iv) a seed laser diode followed by a SOA and then a fiber-optic amplifier. A seed laser diode or a direct-emitter laser diode may be operated in a CW manner (e.g., by driving the laser diode with a substantially constant DC current), and a frequency modulation may be provided by an external modulator (e.g., an electro-optic phase modulator may apply a frequency modulation to seed-laser light). Alternatively, a frequency modulation may be produced by applying a current modulation to a seed laser diode or a direct-emitter laser diode. The current modulation (which may be provided along with a DC bias current) may produce a corresponding refractive-index modulation in the laser diode, which results in a frequency modulation of the light emitted by the laser diode. The current-modulation component (and the corresponding frequency modulation) may have any suitable frequency or shape (e.g., piecewise linear, sinusoidal, triangle-wave, or sawtooth). For example, the current-modulation component (and the resulting frequency modulation of the emitted light) may increase or decrease monotonically over a particular time interval. As another example, the current-modulation component may include a triangle or sawtooth wave with an electrical current that increases or decreases linearly over a particular time interval, and the light emitted by the laser diode may include a corresponding frequency modulation in which the optical frequency increases or decreases approximately linearly over the particular time interval. For example, a light source 110 that emits light with a linear frequency change of 200 MHz over a 2-μs time interval may be referred to as having a frequency modulation m of $10^{14}$ Hz/s (or, 100 MHz/μs).

In addition to producing frequency-modulated emitted light, a light source 110 may also produce frequency-modulated local-oscillator (LO) light. The LO light may be coherent with the emitted light, and the frequency modulation of the LO light may match that of the emitted light. The LO light may be produced by splitting off a portion of the emitted light prior to the emitted light exiting the lidar system. Alternatively, the LO light may be produced by a seed laser diode or a direct-emitter laser diode that is part of the light source 110. For example, the LO light may be emitted from the back facet of a seed laser diode or a direct-emitter laser diode, or the LO light may be split off from the seed light emitted from the front facet of a seed laser diode. The received light (e.g., emitted light that is scattered by a target 130) and the LO light may each be frequency modulated, with a frequency difference or offset that corresponds to the distance to the target 130. For a linearly chirped light source (e.g., a frequency modulation that produces a linear change in frequency with time), the larger the frequency difference is between the received light and the LO light, the farther away the target 130 is located.

A frequency difference between received light and LO light may be determined by mixing the received light with the LO light (e.g., by coupling the two beams onto a detector so they are coherently mixed together at the detector) and determining the resulting beat frequency. For example, a photocurrent signal produced by an APD may include a beat signal resulting from the coherent mixing of the received light and the LO light, and a frequency of the beat signal may correspond to the frequency difference between the received light and the LO light. The photocurrent signal from an APD (or a voltage signal that corresponds to the photocurrent signal) may be analyzed using a frequency-analysis technique (e.g., a fast Fourier transform (FFT) technique) to determine the frequency of the beat signal. If a linear frequency modulation m (e.g., in units of Hz/s) is applied to a CW laser, then the round-trip time T may be related to the frequency difference $\Delta f$ between the received scattered light and the LO light by the expression $T = \Delta f / m$. Additionally, the distance D from the target 130 to the lidar system 100 may be expressed as $D = (\Delta f / m) \cdot c/2$, where c is the speed of light. For example, for a light source 110 with a linear frequency modulation of $10^{14}$ Hz/s, if a frequency difference (between the received scattered light and the LO light) of 33 MHz is measured, then this corresponds to a round-trip time of approximately 330 ns and a distance to the target of approximately 50 meters. As another example, a frequency difference of 133 MHz corresponds to a round-trip time of approximately 1.33 μs and a distance to the target of approximately 200 meters. A receiver or processor of a FMCW lidar system may determine a frequency difference between received scattered light and LO light, and the distance to a target may be determined based on the frequency difference. The frequency difference Δf between received scattered light and LO light corresponds to the round-trip time T (e.g., through the relationship T=Δf/m), and determining the frequency difference may correspond to or may be referred to as determining the round-trip time.

Figure 2:
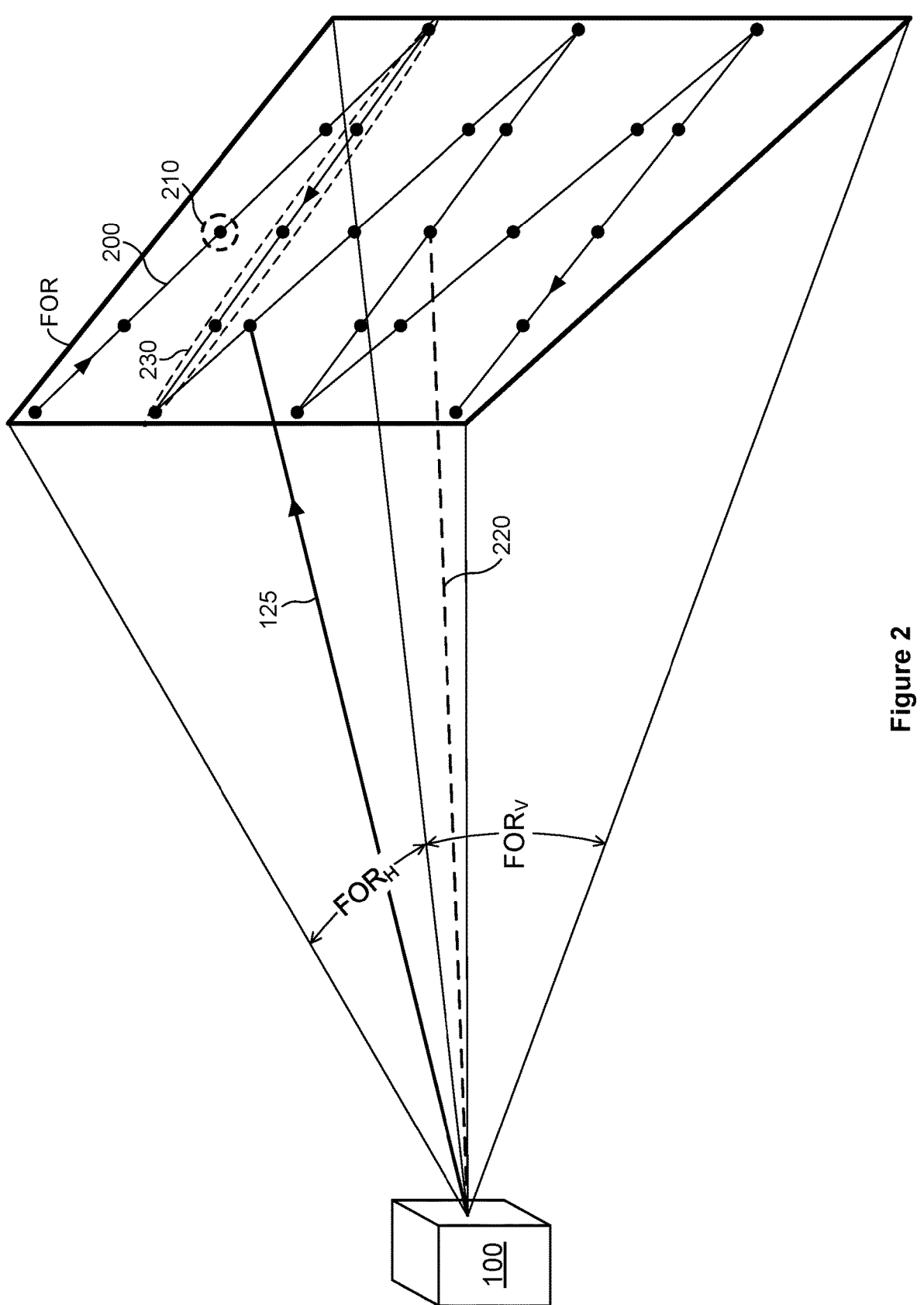
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a field of regard (FOR) of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 by the output beam 125 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR (FOR_H) and any suitable vertical FOR (FOR_V). For example, a scan pattern 200 may have a field of regard represented by angular dimensions (e.g., FOR_H×FOR_V) 40°×30°, 90°×40°, or 60°×15°. As another example, a scan pattern 200 may have a FOR_H greater than or equal to 10°, 25°, 30°, 40°, 60°, 90°, or 120°. As another example, a scan pattern 200 may have a FOR_V greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more optical pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of P_x×P_y pixels 210 (e.g., a two-dimensional distribution of P_x by P_y pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, a pixel 210 may refer to a data element that includes (i) distance information (e.g., a distance from a lidar system 100 to a target 130 from which an associated pulse of light was scattered) or (ii) an elevation angle and an azimuth angle associated with the pixel (e.g., the elevation and azimuth angles along which the associated pulse of light was emitted). Each pixel 210 may be associated with a distance (e.g., a distance to a portion of a target 130 from which an associated pulse of light was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
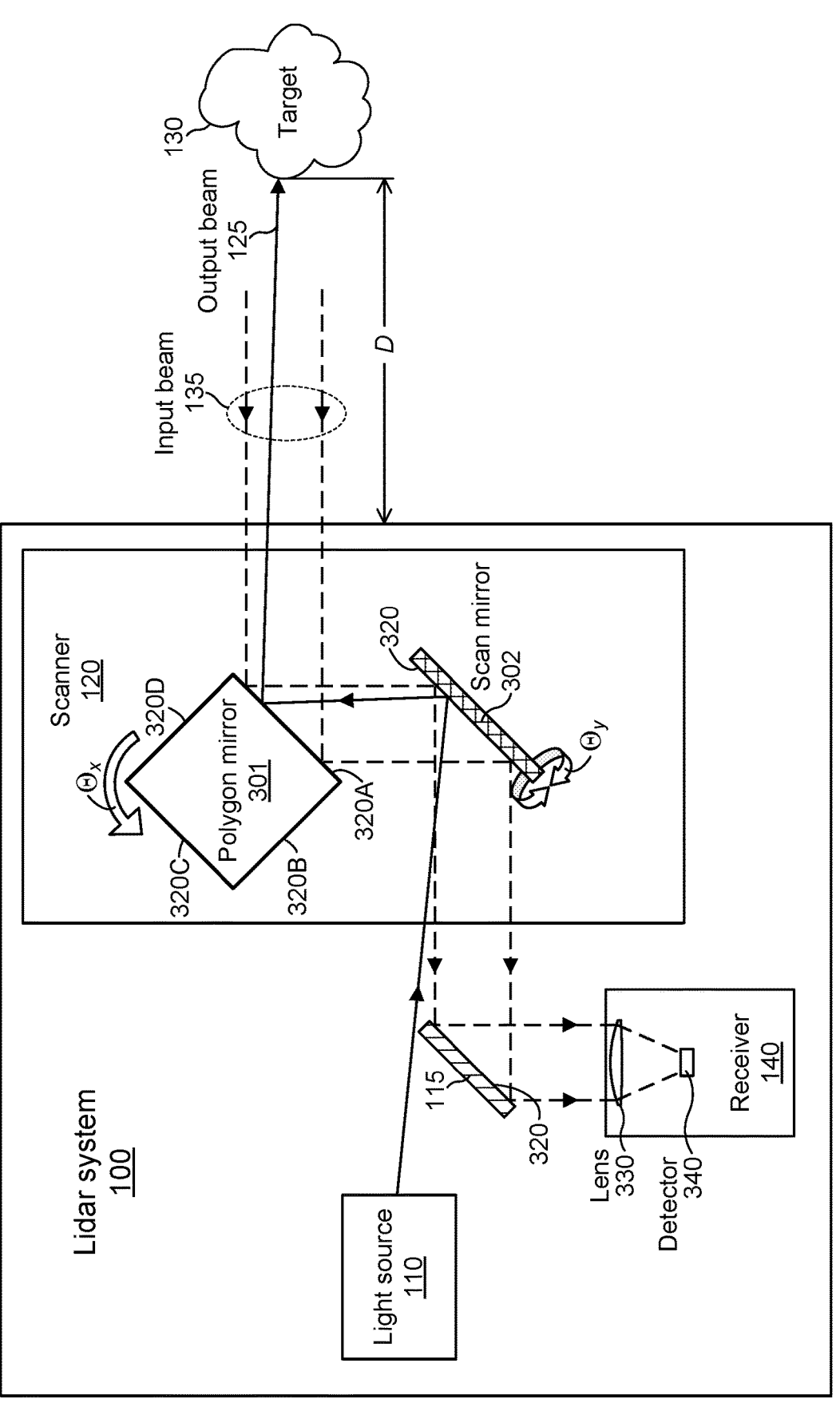
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a first direction and a scan mirror 302 configured to scan output beam 125 along a second direction different from the first direction (e.g., the first and second directions may be approximately orthogonal to one another, or the second direction may be oriented at any suitable non-zero angle with respect to the first direction). In the example of FIG. 3, scanner 120 includes two scanning mirrors: (1) a polygon mirror 301 that rotates along the Θ_x direction and (2) a scanning mirror 302 that oscillates back and forth along the Θ_y direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface)

may include a reflective metallic coating (e.g., gold, silver, or aluminum) or a reflective dielectric coating, and the reflecting surface 320 may have any suitable reflectivity R at an operating wavelength of the light source 110 (e.g., R may be greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a $\Theta_x$ direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)). Alternatively, an electric motor may be configured to rotate the polygon mirror 301 at a rotation frequency that is variable or adjustable. In particular embodiments, a rotational speed may be referred to as a rotation speed, a speed of rotation, a rotational frequency, a rotation frequency, a speed of a polygon mirror, or a rotation rate.

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
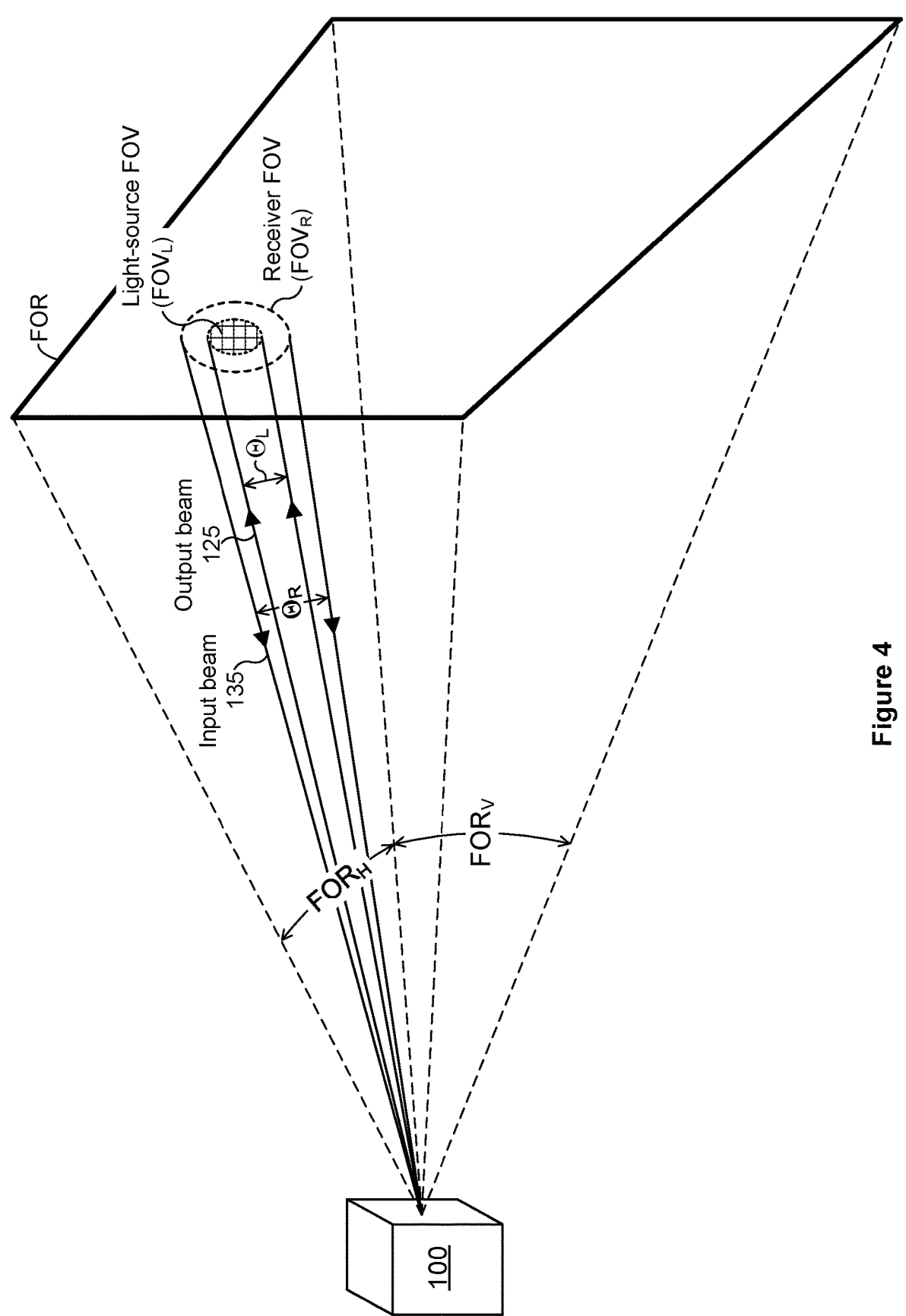
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a ΘL of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
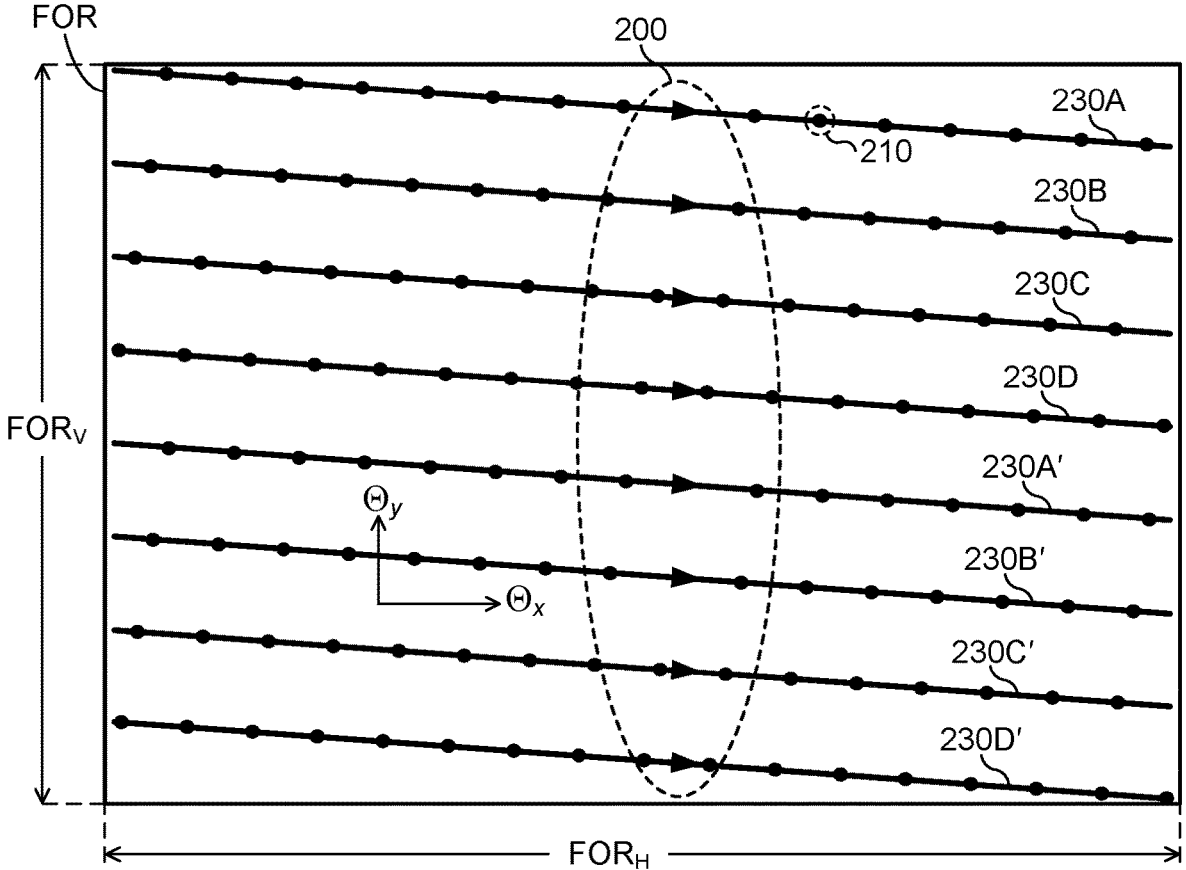
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 2 may be referred to as a bidirectional scan pattern, and the scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
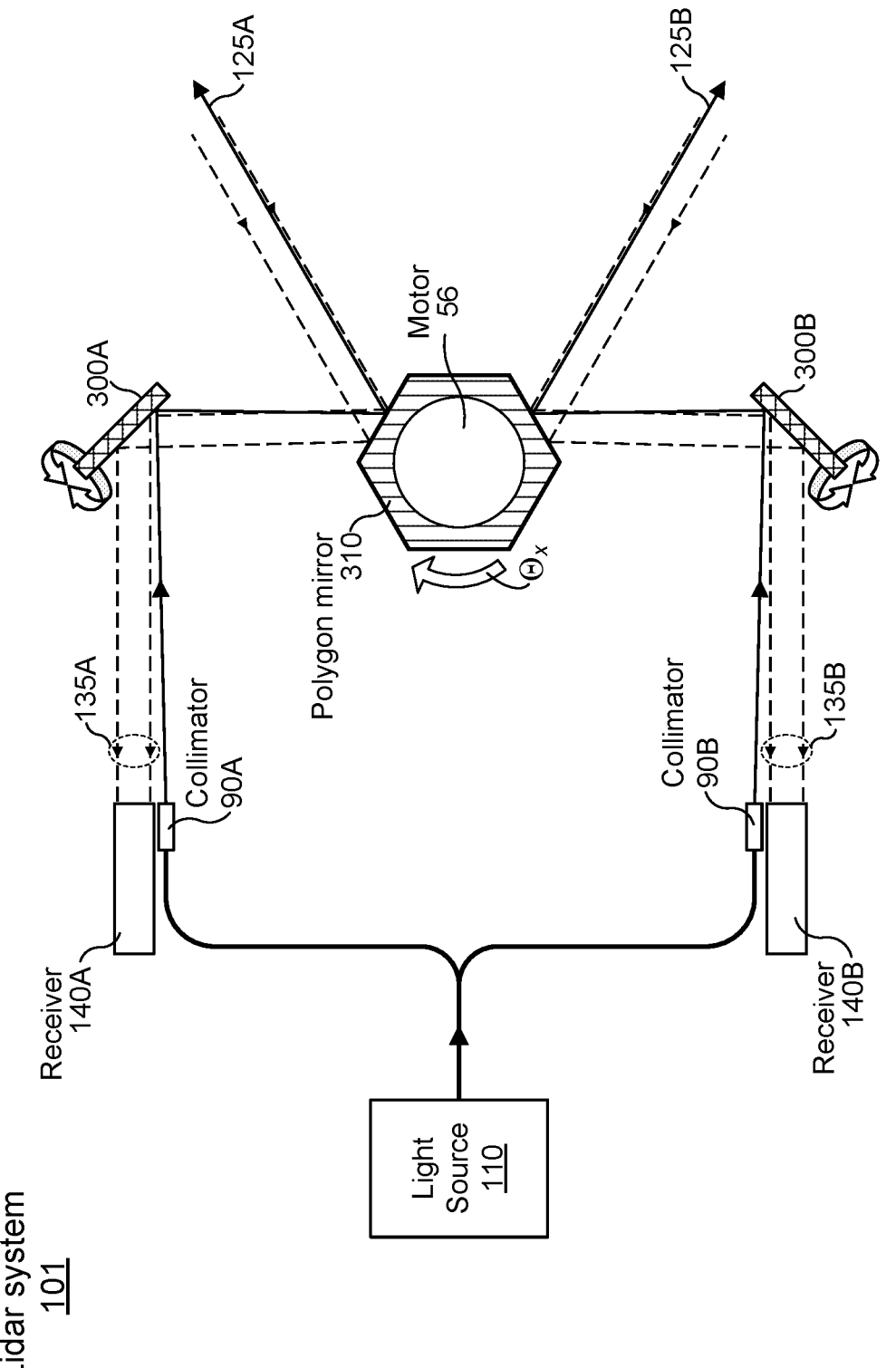
FIG. 6 illustrates a block diagram of an example lidar system in which a scanner equipped with a polygon mirror is configured to operate in a two-eye configuration.

FIG. 6 illustrates a block diagram of an example lidar system 101 in which a scanner equipped with a polygon mirror 310 is configured to operate in a two-eye configuration. Unlike the lidar system 100 discussed above, lidar system 101 operates in a two-eye configuration. In particular, lidar system 101 includes a polygon mirror 310 that directs two output beams, 125A and 125B, toward different regions within the field of regard of the lidar system 101. The field of regard of the lidar system 101 in a sense is made of respective fields of regard of the two eyes, corresponding to the output beams 125A and 125B.

Each of the two eyes of the lidar system 101 includes a collimator, a receiver, and a scan mirror. Thus, one eye of the lidar system 101 includes a collimator 90A coupled to the light source 110 to direct the output beam 125A toward a scan mirror 300A, which then directs the output beam 125A toward a first surface of the polygon mirror 310, while the other eye of the lidar system 101 includes a collimator 90B coupled to the light source 110 to direct the output beam 125B toward a scan mirror 300B, which then directs the output beam 125B toward a second surface of the polygon mirror 310.

In this example implementation, the polygon mirror 310 includes six reflective surfaces, and the output beams 125A and 125B are incident on non-adjacent reflective surfaces. More generally, the polygon mirror 310 may include any suitable number of surfaces, e.g., three, four, five, six, etc.

The output beams 125A and 125B may also be incident on adjacent or non-adjacent reflective surfaces.

An input beam 135A is reflected off the first surface of the polygon mirror 310 toward the scan mirror 300A and, ultimately, toward a receiver 140A. An input beam 135B is reflected off the second surface of the polygon mirror 310 toward the scan mirror 300B and toward a receiver 140B. Each of the receivers 140A and 140B may be implemented similar to the receiver 140 discussed with reference to FIG. 1.

The light source 110 may be configured to emit optical signals. The light source 110 may be a fiber laser that includes a seed laser diode. The output of the light source 110 may be provided to the collimators 90A and 90B via fiber-optic cables, free-space coupling, or in any other suitable manner. While the lidar system 101 uses collimators coupled to a shared light source, in other implementations of this system each eye may include its own direct-emitted laser diode. The light source 110 in this case may be made of multiple direct-emitter laser diodes (e.g., high-power laser diodes) that directly emit the pulses without requiring optical amplification. More generally, the light source 110 may also include optical amplification.

Figure 8:
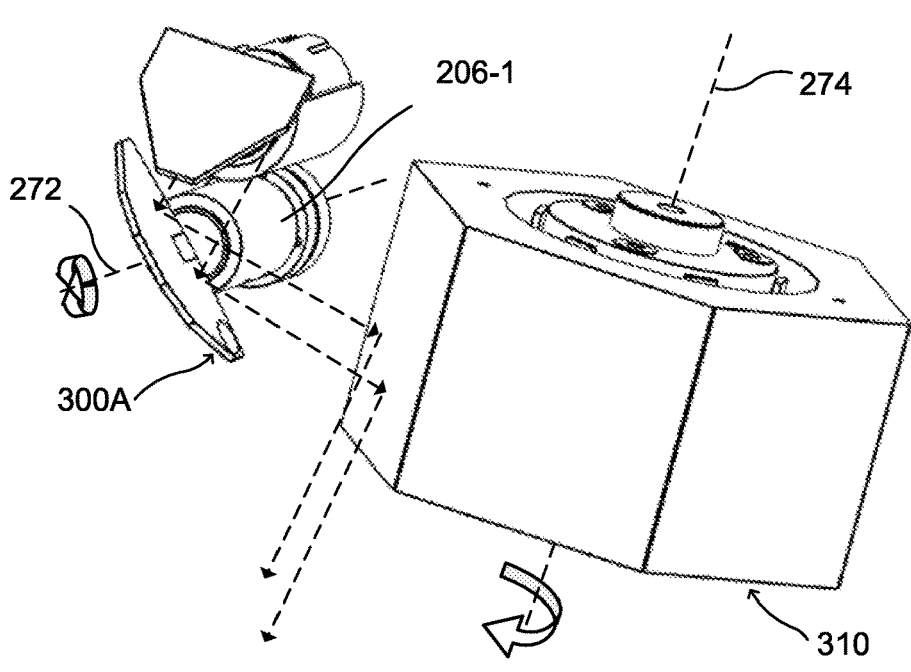
FIG. 8 illustrates an example front perspective view of components from a scanner with the polygon mirror, scanning mirror, and paths of output beams schematically illustrated over the perspective view.
Figure 9:
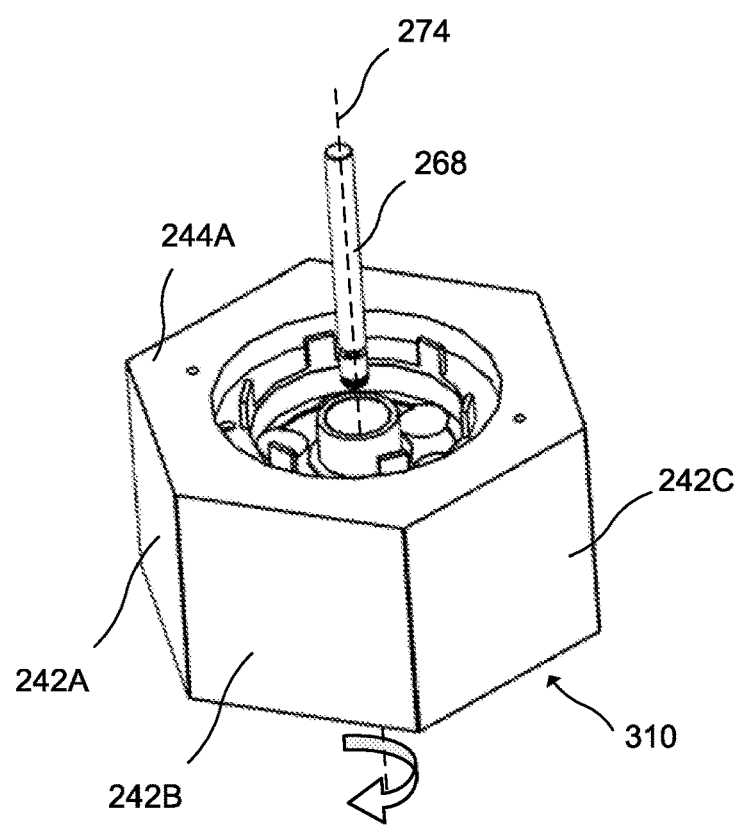
FIG. 9 illustrates an example exploded view of the polygon mirror of a lidar system of FIG. 6.

The polygon mirror 310 may be coupled or attached to a polygon motor 56 that is configured to rotate the polygon mirror 310 around a rotation axis 274 (see FIGS. 8-9). The motor 56 may rotate the polygon mirror 310 at a substantially fixed rotational frequency, or it may rotate at an adjustable or variable rotation frequency. The rotation frequency of the polygon mirror may be any suitable rotation frequency, such as for example 500 RPM, 2,000 RPM, 5,000 RPM, or 12,000 RPM. In particular embodiments, controller 150 may change the rotation frequency of a polygon mirror 310 during operation of lidar system 101, after some optical signals have been emitted by light source 110 and before others are emitted by light source 110.

A lidar system in which the rotation rate of a polygon mirror is adjustable may be referred to as a lidar system with a dynamic scan speed. Adjusting the rotation rate of the polygon mirror corresponds to changing the scan speed of the output and input beams since both may be reflected off the polygon mirror.

Figure 7:
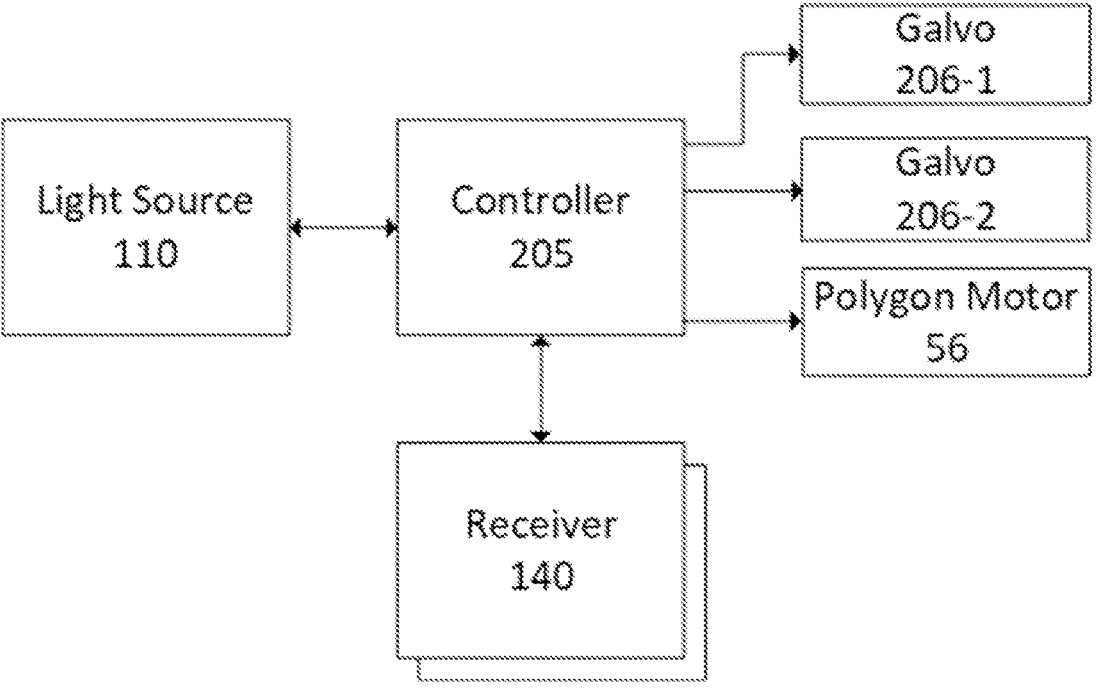
FIG. 7 illustrates a block diagram of an example control sub-system of a lidar system.

FIG. 7 illustrates a block diagram of an example control sub-system of a lidar system 101. Generally speaking, the controller 205 may be similar to the controller 150 of FIG. 1. Controller 205 may control the rotational frequency of the polygon mirror 310. As an example, controller 205 may send a signal to the polygon motor 56 to change the rotation frequency of the polygon mirror 310 after a first set of optical signals has been emitted by light source 110 and before a second set of optical signals has been emitted. In some implementations and/or scenarios, the controller 205 controls the polygon motor 56 to increase or decrease the rotation frequency of the polygon mirror 310. In addition, the controller 205 may provide control signals to the galvanometer scanners 206-1 and 206-2 for scan mirrors 300A and 300B, to adjust the pivot angle, the range of oscillation, the speed of rotation or oscillation, etc. In some implementations and/or scenarios, the controller 205 controls the galvanometer scanners 206-1 and 206-2 so as to generate different scan patterns in different eyes of the lidar system 101. Still further, as illustrated in FIG. 7, the controller 205 may receive signals from the receivers 140A and 140B and determine the distance to the target based at least in part on a time of flight for a pulse of light of an output beam of light to travel from the lidar system 101 to the target 130 and back to the lidar system 101.

A galvanometer scanner 206-1 drives the scan mirror 300A, and a galvanometer scanner 206-2 drives the scan mirror 300B. As discussed above, this may allow the controller 205 to independently control certain operational parameters (e.g., the frequency of oscillation, the range of oscillation) of each scan mirror individually. In other implementations, however, the same galvanometer scanner or the same motor assembly may be used to impart oscillation to both scan mirrors via an appropriate belt drive, for example, to reduce the number of components and improve registration between the two scan mirrors. In this case, the controller 205 may control the scan mirrors 300A and 300B together rather than individually. The scan mirror 300A may be pivotally mounted along a shaft that extends along a scan-mirror pivot axis 272 (see FIG. 8). The scan-mirror pivot axis 272 may be orthogonal or, at least, substantially orthogonal to the polygon-mirror rotation axis 274 with which the polygon mirror axle 268 is coincident (see FIGS. 8 and 9).

In some implementations, lidar system 100 may have a two-eye configuration that includes one polygon mirror and only one scan mirror. It may use one or more light sources. It may function similarly to lidar system of FIG. 3 but may use a configuration that includes two output beams and two input beams.

In other implementations, the scan mirrors 300A and/or 300B may be parts of a microelectromechanical systems (MEMS) device.

The scan mirrors 300A and 300B may be configured so as to pivot over a range of allowable motion larger than a range corresponding to the vertical angular dimension of the field of regard, so as to define a maximum range of allowable motion larger than a range within which the scan mirrors 300A and 300B pivot during a scan. The controller 205 associated with the scan mirrors 300A and 300B may select different portions of the maximum range of allowable motion as the range within which the scan mirror pivots, in accordance with modifications of the scan pattern.

In particular embodiments, to modify at least one of a scan pattern or a scan rate, the controller 205 associated with the motor 56 of the polygon mirror 310 may be configured to cause the motor to vary or adjust the speed of rotation of the polygon mirror 310, cause the drive motor to vary or adjust the oscillation of the scan mirrors 300A and 300B, or both. The controller 205 may be configured to modify the scan pattern on a frame-by-frame basis, each frame corresponding to a complete scan of the field of regard of the lidar system 101. In some implementations, the oscillation of the scan mirrors 300A and 300B may be varied (e.g., to change the vertical angular dimension of the field of regard), and the rotational speed of the polygon mirror 310 may be regulated or stabilized so that the polygon mirror 310 rotates at a substantially constant speed.

In other implementations, the rotational speed of the polygon mirror 310 may be regulated by the controller 205 so that the polygon mirror 310 rotates at a variable or adjustable speed. Such modifications to the polygon rotational speed may affect the scan patterns of both eyes of the lidar system 101.

In some implementations, the controller 205 may slow down the rotation of the polygon mirror 310 when the output beam (or a pair of output beams associated with the same eye) traverses the middle of the scan line, so that pixel density near the center of the horizontal FOR is higher than at the periphery of the horizontal FOR.

In certain embodiments, the polygon rotation rate may depend on the number of output beams used in an eye of the lidar system 100. For example, as the number of beams per eye is increased, the polygon rotation rate may be reduced.

In other implementations, the controller 205 may slow down or speed up the rotation of the polygon mirror across all or a part of the FOR to simulate calibration targets at different distances from the lidar system 101 than actual calibration targets are located. In this way, the controller 205 may vary or adjust a polygon rotation frequency in order to calibrate one or more detectors within the receiver 140. In other scenarios, the controller 205 may vary or adjust the rotation frequency of the polygon mirror 310 in order to change the operating range of the lidar system 101.

For example, one full rotation of the polygon mirror 310 may correspond to an approximately 360-degree rotation of the mirror over a time interval of approximately 12 ms, which corresponds to a rotation rate of approximately 5,000 revolutions per minute (RPM). The rotation rate may be approximately constant (e.g., approximately 5,000 RPM), or the rotation rate may be varied (e.g., between approximately 2,000 RPM and approximately 10,000 RPM) to accomplish a desired result such as to adjust the density of pixels in a scan, the operating range of the lidar system 101, or to calibrate the lidar system 101.

FIG. 8 illustrates an example front perspective view of components from a scanner 120 with a polygon mirror 310, scanning mirror 300A, and paths of output beams schematically illustrated over the perspective view. The scanning mirror 300A may be attached to galvanometer scanner 206-1. As discussed above, it may be pivotally mounted along a shaft that extends along a scan-mirror pivot axis 272. In some embodiments, the scanning mirror 300A may be used to scan the optical signals emitted by light source 110 along a vertical dimension of the field of regard. The scanning mirror pivot axis 272 may be orthogonal to the axis of rotation of the polygon mirror 274. The polygon mirror 310 may have a plurality of reflective surfaces angularly offset from one another.

FIG. 9 illustrates an example exploded view of the polygon mirror 310 of the lidar system 101 of FIG. 6. The rotatable polygon mirror 310 may include a block of hexagonal shape with six finished reflective surfaces 242A, 242B, 242C, etc. It is possible, however, to a use a triangle-shaped rotatable polygon mirror with three reflective surfaces, a square shape with four reflective surfaces, an octagonal shape with eight reflective surfaces, etc. In another implementation, not every surface of the rotatable polygon mirror oriented toward the scan mirror 300A is reflective (e.g., the rotatable polygon mirror may be a flat substrate with reflective surfaces on the front and back sides). In certain embodiments, the reflective surfaces do not need to be of equal size or shape. More generally, the rotatable polygon mirror 310 may have any suitable number of reflective surfaces, such as for example 3, 4, 5, 6, 7, 8, 9, 10, 11, or 12 reflective surfaces.

The polygon mirror 310 may be made from any suitable material, such as for example, glass, plastic (e.g., polycarbonate), metal (e.g., aluminum or beryllium), metal foam, carbon fiber, ceramic, or any suitable combination thereof. The reflective surfaces 242A, 242B, 242C, etc. of the polygon mirror 310 may be manufactured using surface replication techniques, and coarse as well as fine balancing techniques may be applied to the polygon mirror 310.

Each of the reflective surfaces 242A, 242B, 242C, etc. may extend between the first wall 244A and a second wall (not visible in FIG. 9) on the other side of the polygon mirror block. The reflective surfaces may be angularly offset from one another along a periphery of the block of polygon mirror 310.

Generally speaking, as the polygon mirror 310 rotates, the scanner may produce one scan line for each reflective surface 242A, 242B, 242C, etc. of the polygon mirror 310, for each eye of the lidar system 101. The scan mirror 300A may pivot to distribute the scan lines across the FOR of the first eye, and the scan mirror 300B may pivot to distribute the scan lines across the FOR of the second eye. Thus, if the scan lines are directed horizontally, the polygon mirror 310 may be responsible primarily for the horizontal dimension of the field of regard ($FOR_H$), and the scan mirrors 300A and 300B accordingly may be responsible for vertical dimension of the corresponding field of regard ($FOR_V$). In other implementations or orientations, however, the polygon mirror 310 may be responsible for $FOR_V$, and the scan mirrors 300A and 300B may be responsible for $FOR_H$.

The polygon mirror 310 may be mounted on a polygon mirror axle 268. The polygon mirror axle 268 may extend through at least one of the first 244A and second (not visible in FIG. 9) walls. A motor may drive the polygon mirror axle 268, thereby imparting rotational oscillation to the rotatable polygon mirror 310. The motor may be a synchronous brushless DC motor in driving relationship with the axle 268. The motor may drive rotation of the rotatable polygon mirror 310 in an open-loop or closed-loop fashion. In general, the motor may be any actuator or mechanism suitable for rotating the polygon mirror 310.

In some implementations, the motor 56 driving rotation of the polygon mirror 310 may operate in a closed-loop mode, where the motor 56 receives a control signal that regulates, stabilizes, or adjusts the rotational speed of the polygon mirror 310. For example, the polygon mirror 310 may be provided with a tab that passes through one or more stationary photo-interrupters as the polygon mirror 310 rotates. The signals from the photo-interrupters may be sent to the controller 205, and the controller 205 may provide a control signal to the motor 56 to maintain the rotational speed of the polygon mirror 310 at a substantially constant value. In other implementations, however, the controller 205 modifies the drive signal supplied to the motor 56 to thereby adjust the rotation of the polygon mirror 310.

The controller 205 may modify the drive signal for the motor 56 dynamically in response to various triggering events or desirable attributes of the lidar system 101. Examples of this include calibrating the lidar system 101 (e.g., if calibration targets are located at fixed positions from the lidar system 101, the lidar system 101 may modify the rotation rate of the polygon mirror 310 to be able to simulate targets at other locations), changing the operating range of the lidar system 101 to increase or decrease such range, or the lidar system 101 may modify the scan pattern to obtain a higher density rate toward the middle of the FOR in order to focus on an area of interest.

Figure 10:
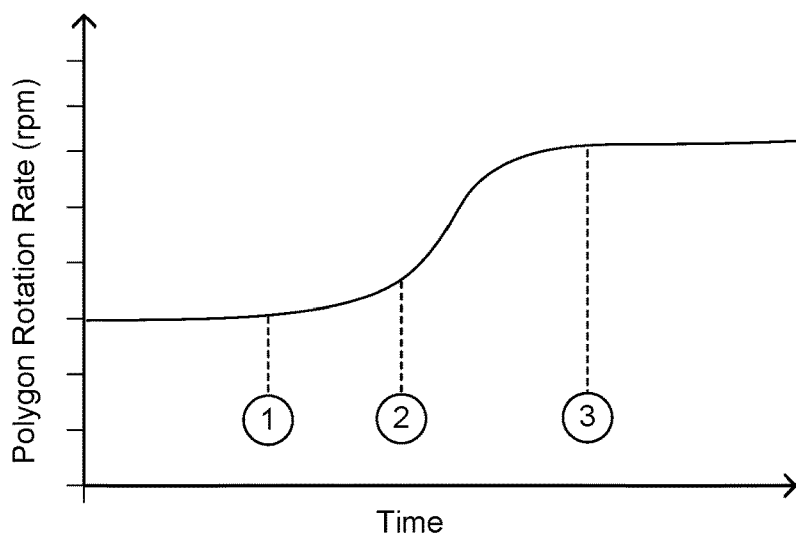
FIG. 10 illustrates an example technique for varying or adjusting the polygon rotation rate as a function of time, which may operate in the lidar system of FIG. 3 or 6.

FIG. 10 illustrates an example technique for varying or adjusting the polygon rotation rate as a function of time, which may operate, for example, in the lidar system of FIG. 3 or 6. The graph of FIG. 10 illustrates the relationship between polygon rotation rate and time. The polygon rotation rate may also be referred to as a rotation frequency, and may be measured, for example, in radians, degrees, or revolutions per second. Any suitable rotation rate may be used. For example, 500 revolutions per minute (RPM), 2,000 RPM, or 12,000 RPM. In particular embodiments, the rotation rate may be increased as a function of time, such that the rotation rate for a first set of optical signals emitted by the light source 110 is lower than the rotation rate applied to a second set of optical signals emitted by the light source 110. For example, as shown in the diagram, the polygon rotation rate applied to signals emitted by the light source 110 at Time 1 is slower than for signals emitted at Time 3. Signals emitted at Time 2 have a polygon rotation rate in between the rotation rates of Time 1 and Time 3, since at Time 2 the polygon rotation rate is in transition from the first polygon rotation rate to the next polygon rotation rate.

In some embodiments, the rotation rate may be decreased over time, or may be changed in response to characteristics of received optical signals. For example, the polygon rotation rate may be changed to increase or decrease the maximum operating range of the lidar system 101. In other embodiments, the rotation rate may be changed in order to calibrate the receiver 140 of the lidar system 101 as illustrated in FIG. 11.

Figure 11:
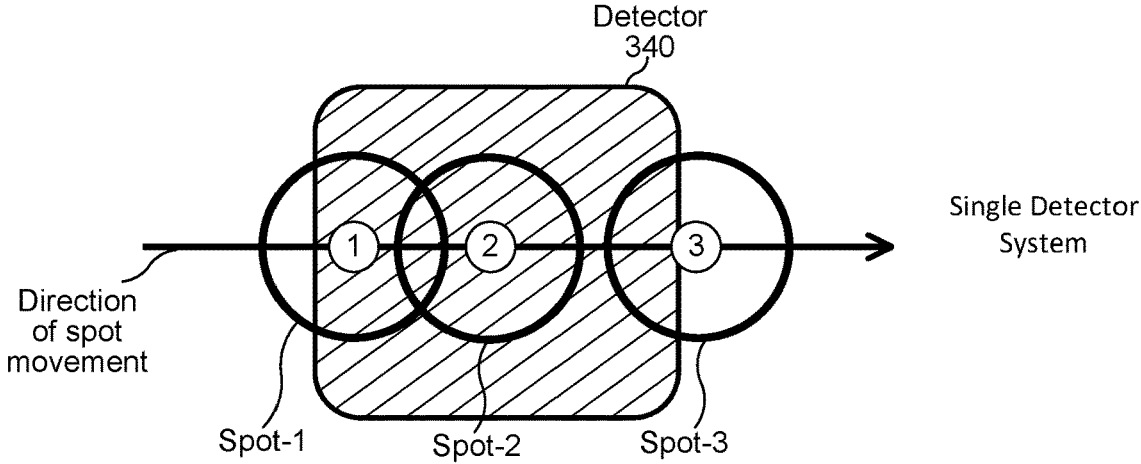
FIG. 11 illustrates three example spots of light received from a fixed distance target, superimposed onto an example detector.

FIG. 11 illustrates three example spots of light: Spot-1, Spot-2, and Spot-3, received after being reflected from a target 130 located a fixed distance from the lidar system 101, superimposed onto an example detector 340. The fixed distance target 130 may be a calibration target used for calibrating the lidar system 101.

In particular embodiments, the receiver 140 of lidar system 100 may include a detector 340 that may detect optical signals received after being reflected from a calibration target 130 located a fixed distance from the lidar system 100. In response, the detector 340 may produce an electrical signal corresponding to the received optical signal. A controller may adjust the rotation rate of the polygon mirror 301 to a new rotation rate for later-received optical signals.

The ability to control where the reflected signals land on the detector may offer an improved ability to test and calibrate one or more detectors, or parts of a detector, in the receiver 140 of a lidar system 100. For example, the controller may increase the rotation rate of the polygon mirror 301. In such case, with a fixed distance target 130, the increased rotation rate may cause an optical signal received after the rotation rate change to land on the detector farther along in the direction of spot movement. In this way, the controller may cause a different area of the detector to be activated by light returning from the same calibration target so that such area may be tested or calibrated. The rotation rate of the polygon mirror 301 may effectively be used to simulate a virtual calibration target at a different distance than calibration target 130 is actually located for the purpose of calibrating receiver 140. For example, a target could be simulated near the maximum operating range of the lidar system in the absence of a physical target located at that distance. In some embodiments, this could allow calibration of different areas of the detector or detectors. As an example, a correction factor could be determined for some of the areas of detector 340 on which a received optical signal impinged.

With reference to FIG. 11 as an example, the three beam spots (Spot-1, Spot-2, and Spot-3) may be located at three different positions relative to the detector 340. The three beam spots (Spot-1, Spot-2, and Spot-3) may correspond to optical signals received at the three polygon rotation rates, 1, 2, and 3, illustrated in FIG. 10. The spots may represent received light scattered from a calibration target 130 located a fixed distance from a lidar system 101 and within the operating range of the lidar system 101. The location of each of the spots may depend on the rotation rate of the polygon mirror 310 when the spots are received. The spots may move across the detector 340 in the direction of spot movement (e.g., from left to right in FIG. 11) as the polygon rotation rate increases. For example, Spot-1 may represent a spot of scattered light received from the target 130 at a relatively slow polygon rotation rate (e.g., at 2,000 RPM), and Spot-3 may represent a spot of scattered light received from the target 130 after the polygon rotation rate has been increased (e.g., to 10,000 RPM). Spot-2 may represent scattered light received from the target 130 at an intermediate polygon rotation rate as the rotation rate is changing.

Figure 12:
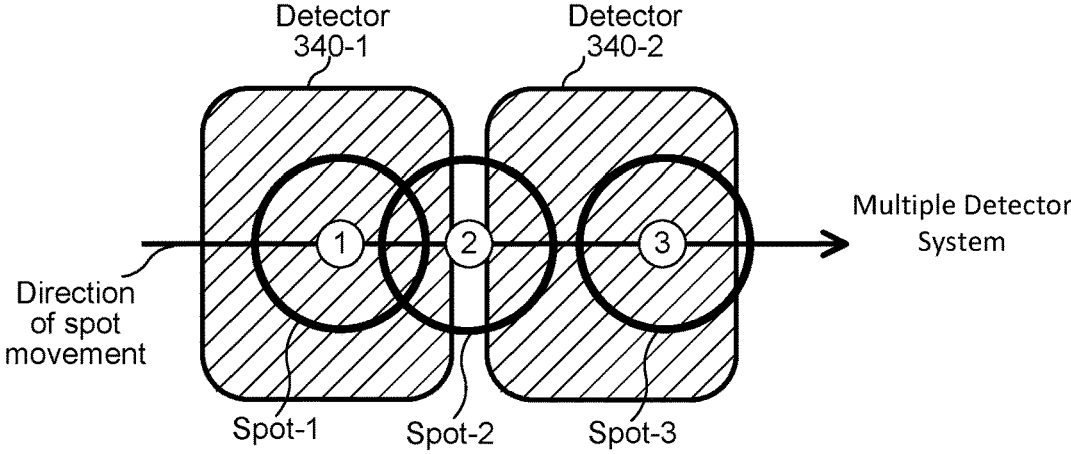
FIG. 12 illustrates three example spots of light received from a fixed distance target, superimposed onto two example detectors.

FIG. 12 illustrates three example spots of light (Spot-1, Spot-2, and Spot-3) received from a fixed distance target 130, superimposed onto two example detectors 340-1 and 340-2. Both detectors may be configured to detect an optical signal received from a calibration target 130 and produce a corresponding electrical signal. The two detectors 340-1 and 340-2 may be part of a receiver 140 similar to that illustrated in FIG. 1, and the beam spots (Spot-1, Spot-2, and Spot-3) are located at three different positions relative to the two detectors 340-1 and 340-2. The spots, spot location, and spot movement function similarly to the spots in FIG. 11, and may correspond to the rotation rate of the polygon mirror 310.

In particular embodiments, a receiver 140 may include two or more detectors 340. Detector 340-1 and detector 340-2 in FIG. 12 may each include any suitable type of detector, such as for example, an avalanche photodiode (APD) or a PIN photodiode. For example, detectors 340-1 and 340-2 may each be an InGaAs APD configured to detect light at one or more operating wavelengths of a lidar system 100 between 1200 nm and 1600 nm. The two detectors 340-1 and 340-2 may be separate detector components that are contained in separate packages or chips. As an example detector 340-1 may be part of a first detector chip and detector 340-2 may be part of a second detector chip that is separate from the first detector chip. Alternatively, the two detectors 340-1 and 340-2 may be contained in the same package or integrated into the same chip.

For example, as the rotation rate of the polygon mirror 310 is increased by a controller 205, the spots may move across the detectors 340-1 and 340-2 in the direction of spot movement (e.g., from left to right in FIG. 12). In certain embodiments, at a first rotation rate, Spot-1 which may be scattered by a calibration target 130 may land primarily on detector 340-1, whereas Spot-3 returning from the same calibration target 130 but at an increased polygon 310 rotation rate, may land primarily on detector 340-2. As an example, at an intermediate polygon rotation rate, Spot-2 returning from the same calibration target may fall somewhat evenly on both detector 340-1 and 340-2. In some embodiments, this could allow calibration of the crossover from one detector to another or other areas of the detectors, without changing the distance to calibration target 130. This may be achieved by altering the polygon rotation rate. As another example, a controller 250 may send control signals to the polygon mirror 310 adjust the rotation rate of the polygon mirror 310 in order to determine the rotation rate at which the electrical signals produced by detector 340-1 and detector 340-2, in response to optical signals received subsequent to the polygon rotation rate change, are approximately equal. In another embodiment, the controller 250 could decrease the polygon rotation rate which would cause a spot of light to land less far in the direction of spot movement (i.e. farther left in FIG. 12), or change the rotation rate multiple times to help calibrate receiver 140.

Figure 13:
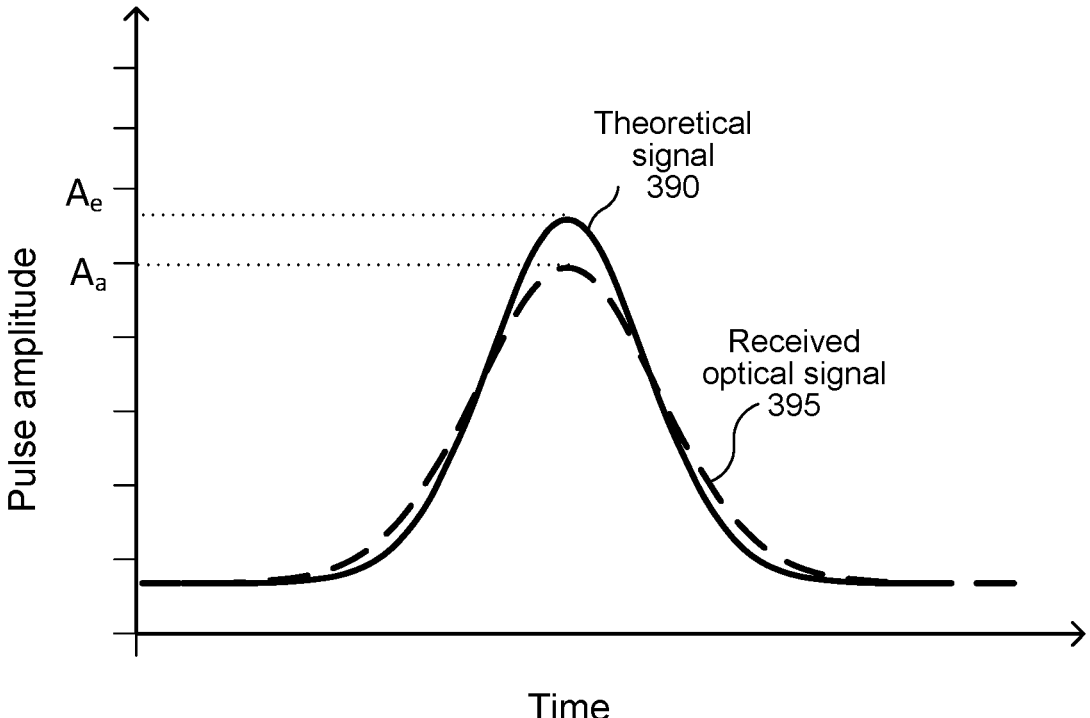
FIG. 13 illustrates an example theoretical signal and corresponding received optical signal.

FIG. 13 illustrates an example theoretical signal 390 and corresponding received optical signal 395. The graph of FIG. 13 is an example illustration of the relationship between signal amplitude and time for both a theoretical return signal 390 and an actual received optical signal 395.

The signal amplitude may also be referred to as an amplitude, or pulse amplitude, and may be expressed, for example, as a ratio of amplitudes. In certain embodiments, detector 340 may detect an optical signal scattered by a calibration target 130 and produce an electrical signal corresponding to the received optical signal. Receiver 140 may determine an actual amplitude of the received optical signal 395 based in part on the electrical signal produced by detector 340. A theoretical signal 390 may also be determined to represent what a received signal might be expected to look like. Any suitable method for determining a theoretical amplitude of a received signal may be used. For example, the controller 150 may include a processor used to estimate the shape of a theoretical signal based on known characteristics of calibration target 130, such as distance to the target, or the target's reflectivity. The theoretical signal may also be estimated in part based on known characteristics of the light source 110, such as the amount of power or wavelength at which a set of optical signals has been emitted by light source 110.

The amount of power of an optical signal may correspond to any suitable optical characteristic of the emitted optical signal, for example, peak optical power, average optical power, peak optical intensity, optical pulse energy.

Similarly, the amplitude of an optical signal may correspond to any suitable optical characteristic of the optical signal, for example, peak optical power, average optical power, peak optical intensity, or optical pulse energy.

An optical characteristic of optical pulses may be analyzed in any suitable manner, for example based on one or more output electrical signals associated with the pulse and produced by the receiver 140. In certain embodiments, a controller 150 may determine the peak voltage of a voltage signal associated with the optical pulse. Rather than determining values for the optical power or intensity of an optical pulse (e.g., by using a formula or lookup table), a controller 150 may determine the peak voltage value of an output electrical signal. As another example, a controller 150 may analyze the area under a voltage-signal curve to determine the energy of a corresponding optical pulse.

In certain embodiments, the difference in amplitude between a theoretical signal 390 and a received optical signal 395 may be determined by the processor (e.g., controller 150 of a lidar system 100). As an example, Ae may represent the expected amplitude of theoretical signal 390, while Aa may represent the amplitude of received optical signal 395. In certain embodiments, the difference between theoretical amplitude Ae and received amplitude Aa may be determined or estimated. As an example, this difference may be used by the processor to determine one or more correction factors for detector 340.

In some embodiments, the receiver 140 includes a detector 340 configured to detect input beam 135 (see, for example, FIGS. 20 and 21) and produce an electrical signal 360 corresponding to input beam 135. The light source may emit the output beam 125 with an amount of power, and a target 130A may have a known reflectivity value. A reflectivity value R may also be referred to as a target's reflectivity or reflectivity profile. In certain embodiments, the target 130 may be a diffusely reflecting surface (e.g., a Lambertian scattering target) that scatters incident light approximately uniformly in all directions. The reflectivity value R may provide, at the operating wavelength of the lidar system, an indication of how much light will be scattered back from target 130 and received by the receiver 140. In particular embodiments, a processor (e.g., controller 150 of a lidar system 100) may determine a reflectivity value R for a target

130. The reflectivity value R may correspond to the ratio of light that is scattered or reflected by a target 130 to light that is incident on the target 130. For example, the reflectivity may correspond to the ratio ($E_{ref}/E_{inc}$), where $E_{inc}$ is the energy of an incident pulse of light and $E_{ref}$ is the energy of the incident pulse of light after being reflected from the target 130. A calibration target may have any suitable reflectivity R such as, for example, approximately 5%, 20%, 75% or 95%.

In particular embodiments, the receiver 140 may be configured to determine an actual amplitude of input beam 135 based at least in part on the electrical signal 360 produced by the detector, and determine an expected amplitude of the input beam 135 based at least in part on the amount of power of an emitted signal, the known reflectivity value R of target 130A, and the distance to the target $D_4$. As an example, the lidar system 100 may then determine a correction factor for the detector based at least in part on a disparity between the expected amplitude and the actual amplitude.

In some embodiments, a controller 150 of lidar system 100 may adjust the rotation rate of the polygon mirror to determine one or more correction factors for a detector 340 (for example a different factor for different areas of the detector activated by different polygon rotation rates), or multiple detectors such as 340-1 and 340-2, in order to calibrate receiver 140.

FIGS. 14-16 illustrate example graphs of polygon rotation rate, operating range, and pulse repetition frequency plotted versus time. The graph of FIG. 14 is an example illustration of the relationship between polygon rotation rate and time, and functions similarly to the graph in FIG. 10. In some embodiments the polygon rotation rate may be varied as a function of time to obtain desired results.

The graph of FIG. 15 is an example illustration of the relationship between operating range and time. Operating range may be related, for example, to the rotational speed of the polygon mirror 310 or characteristics of the detector 340. The relationship between operating range and polygon rotation rate may be an inverse relationship as depicted in FIGS. 14 and 15. In certain embodiments, as the rotation rate is decreased, the operating range increases. This may occur because if the polygon rotation rate is decreased, signals returning from targets 130 located farther from lidar system 100 may still impinge on a detector 340 of the receiver 140, whereas at a faster rotation rate they may not. As an example, an output beam 125 may travel farther to a more distant target 130 and the input beam 135 may still reach receiver 140, despite the additional travel time, if scanner 120 uses a slower polygon rotation rate. For example, at Time 1, the polygon rotation rate is high, and the corresponding operating range is low, whereas at Time 3, the polygon rotation rate has decreased and a corresponding increase in the operating range may be observed. Time 2 depicts an intermediate scenario that may occur as controller 205 changes the polygon rotation rate.

The graph of FIG. 16 is an example illustration of the relationship between pulse repetition frequency and time. As an example, lidar system 100 may be a pulse lidar system, where the light source 110 produces pulses of light with a particular pulse repetition frequency. As discussed in more detail with respect to FIGS. 22-23, if a target 130 is located a distance less than $R_{OP}$, then scattered light from the target may be received by a lidar system 100 before the time τ has elapsed and before a subsequent pulse is emitted. In certain embodiments, to avoid range ambiguity, the pulse repetition frequency of lidar system 100 may be reduced in response to an increase in operating range due to a decreased polygon rotation rate. For example, as the polygon rotation rate is decreased from Time 1 to Time 3, as depicted in FIG. 14, the $R_{OP}$ of lidar system 100 may increase as shown in FIG. 15 for the corresponding times Time 1 and Time 3. In response to such an increase, the pulse repetition frequency of light source 110 may be decreased at corresponding times, as depicted in FIG. 16, in order to reduce the possibility of range ambiguity.

In certain embodiments, the controller 205 may adjust the rotation rate of the polygon mirror 310 at least in part to change the operating range of lidar system 100. In one example, an increase in the rotation rate may decrease the operating range of the lidar system 100 and decreasing the rotation rate may increase the operating range of the lidar system 100. In another embodiment, when the controller 205 adjusts the rotation rate of the polygon mirror 310, it may also adjust a pulse repetition frequency of the light source 110 based in part on the change to the rotation rate. As an example, it may be desirable for the controller 205 to increase the pulse repetition frequency as a function of time to correspond to an increase in the polygon rotation rate and resulting decrease in operating range. This could increase the resolution of a resulting point cloud.

Figure 17:
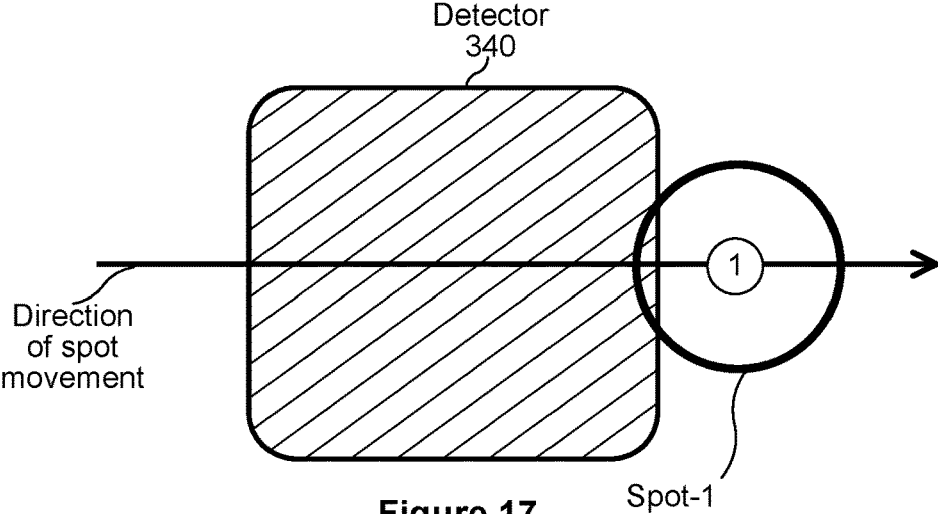
FIGS. 17-19 illustrate example spots of light received from a target, superimposed onto example detectors.
Figure 18:
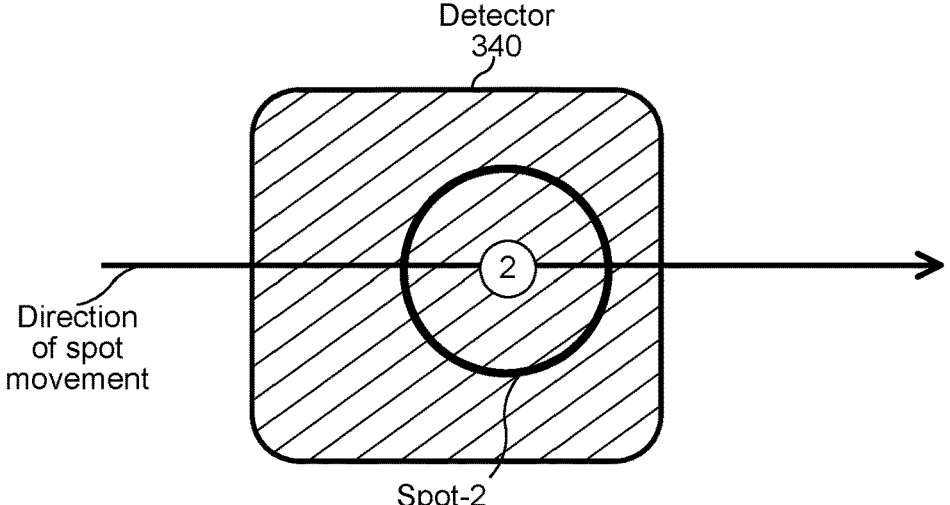
Figure 19:
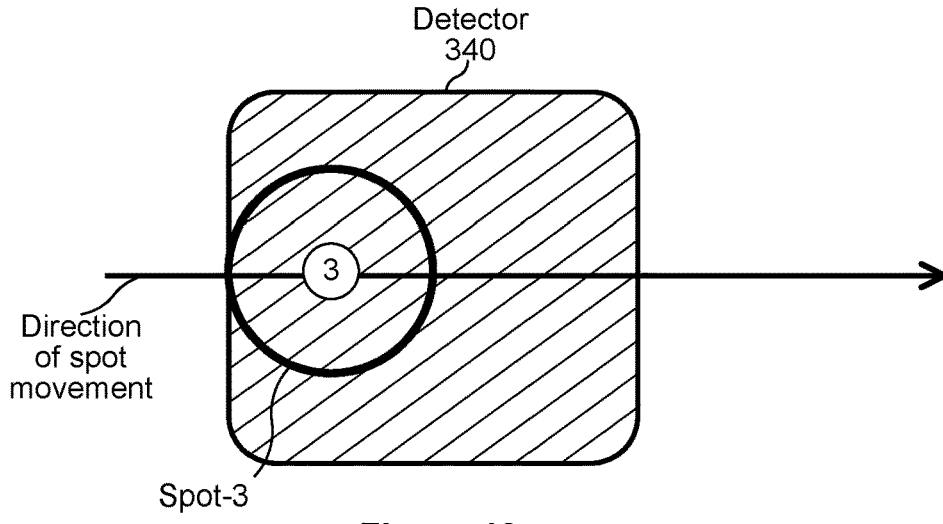

In another embodiment, it may be desirable for the controller 205 to be configured to decrease the pulse repetition frequency based at least in part on a decreased rotation rate of the polygon mirror 310 which causes an increase in operating range. In such a case, the point cloud resolution reduction may be offset by a longer operating range FIGS. 17-19 illustrate example spots of light received from a target 130, superimposed onto example detectors 340. The spots of light and spot movement may function similarly to that discussed with respect to FIG. 11. In particular embodiments, the receiver 140 of lidar system 100 may include a detector 340 that may detect optical signals received after being reflected from a target 130 located a distance from the lidar system. In response, the detector 340 may produce an electrical signal corresponding to the received optical signal. As an example, controller 205 may adjust the rotation rate of the polygon mirror 301 to a new rotation rate for later-received optical signals.

As an example, the controller may decrease the rotation rate of the polygon mirror 301. In such case, with a target 130, the decreased rotation rate may cause an optical signal received after the rotation rate change to land on the detector 340 earlier along in the direction of spot movement. In this way, the controller 205 may cause a received optical signal to fall on a different area of the detector than it would have before the rotation rate change, for example it could cause a received optical signal to land more completely within the area in which the detector 340 may detect optical signals. For example, Spot-1 in FIG. 17 may represent an optical signal at or beyond the maximum operating range of the lidar system 100. Optical signals arriving from a target 130 beyond that distance may not be detected as well by the detector 340. The rotation rate of the polygon mirror 301, however, could be decreased so that the received optical signal from that distance target 130 would land earlier in the direction of spot movement, such as Spot-2 in FIG. 18 or Spot-3 in FIG. 19. The rotation rate of the polygon mirror 301 in this way may effectively be used to increase the operating range of the lidar system 100.

Alternatively, in other embodiments, the controller 205 may be configured to adjust the rotation rate of the polygon mirror 301 to alter an operating range of the lidar system 100, such that the rotation rate is increased so that the operating range of the lidar system 100 is decreased.

A controller 205 could vary or adjust the rotation rate over time, as lidar system 100 is in operation, to increase or decrease the operating range of lidar system 100 based on the environment or needs of lidar system 100 (e.g. highway driving, open roads, city traffic, road congestion, etc.).

In still other embodiments, a multiple detector system may be employed, such as in FIG. 12, and the controller 205 may use the polygon mirror 301 rotation rate to modify the operating range of the lidar system 100 as described above with respect to FIGS. 17-19.

Figure 20:
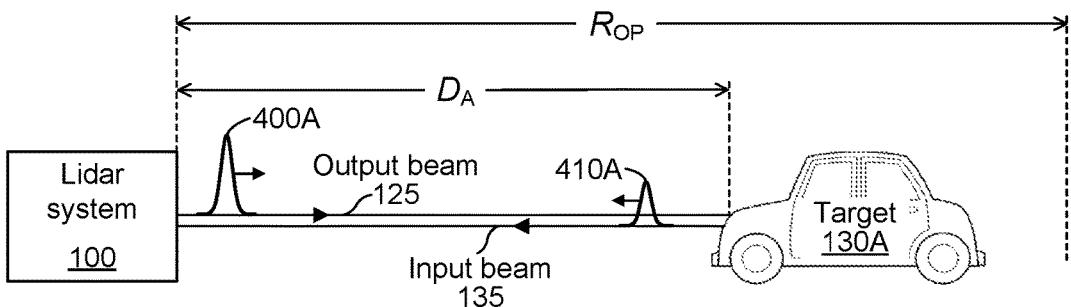
FIG. 20 illustrates an example lidar system and target that is located within an operating range ($R_{OP}$) of the lidar system.

FIG. 20 illustrates an example lidar system 100 and target 130A that is located within an operating range ($R_{OP}$) of the lidar system 100. In particular embodiments, a lidar system 100 may include a light source 110 configured to emit multiple pulses of light that are directed into a field of regard of the lidar system 100. The lidar system 100 in FIG. 20 emits an output beam 125 that includes an optical pulse 400A. The optical pulse 400A propagates to a target 130A located a distance $D_A$ from the lidar system, where $D_A$ is less than the operating range $R_{OP}$. The optical pulse 400A is scattered by the target 130A, and a portion of the scattered light propagates back to the lidar system 100 as input beam 135. The input beam 135 includes optical pulse 410A which includes a portion of the optical pulse 400A emitted by the lidar system 100 and scattered by the target 130A. The lidar system 100 may include a receiver 140 that detects the received optical pulse 410A. Additionally, the lidar system 100 may include a controller 205 that determines the distance $D_A$ to the target 130A based on the time interval between emission of the optical pulse 400A and detection of the optical pulse 410A. In particular embodiments, an output beam 125 may include or may be referred to as an optical signal, and an input beam 135 may include or may be referred to as a received optical signal.

Figure 21:
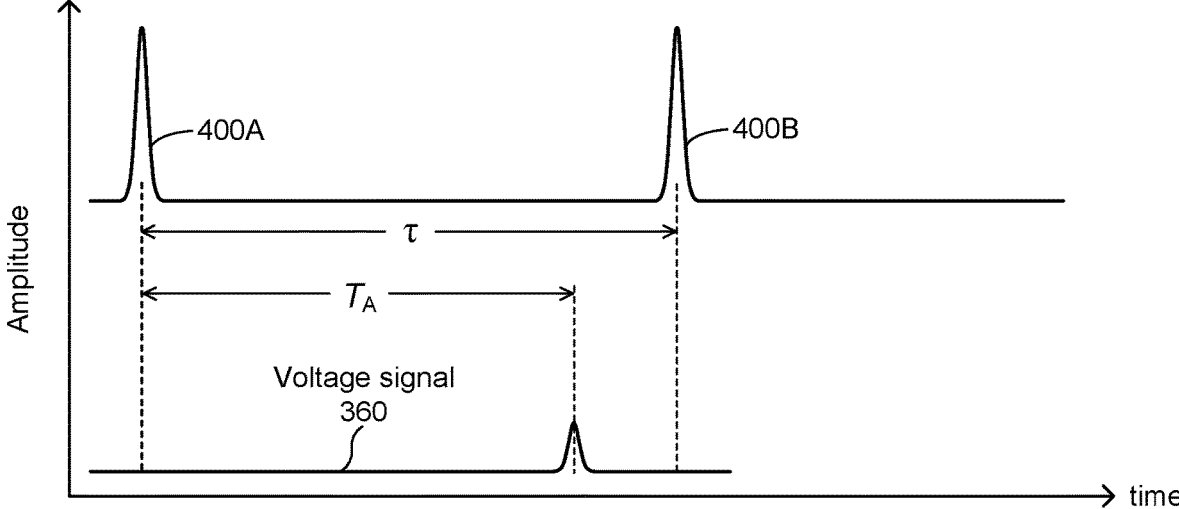
FIG. 21 illustrates example optical pulses emitted by a lidar system, such as in FIG. 20, and a voltage signal corresponding to a received optical signal.

FIG. 21 illustrates example optical pulses 400A and 400B emitted by a lidar system 100, such as in FIG. 20, and a voltage signal 360 corresponding to a received optical signal. In particular embodiments, a lidar system 100 may be configured to emit multiple pulses of light, where each pulse of light is emitted a particular time interval after the previously emitted pulse of light. The lidar system 100 in FIG. 20 emits optical pulse 400B a time interval t after optical pulse 400A is emitted. For example, the time interval t (which may be referred to as a pulse period) between two successive optical pulses may be approximately 20 ns, 50 ns, 100 ns, 500 ns, 1 ps, 2 ps, 5 ps, 10 ps, or any other suitable interval of time. The received optical signal that includes the scattered light from optical pulse 400A is detected by a receiver 140 of lidar system 100, and the receiver 140 may produce the corresponding voltage signal 360 in FIG. 21. The voltage signal 360 includes an electrical pulse that is produced a time interval $T_A$ after the emission of the optical pulse 400A and that corresponds to receipt of the scattered optical pulse 410A. A lidar system 100 may determine the distance $D_A$ to the target 130A based on the time $T_A$ between emission of the optical pulse 400A and detection of the optical pulse 410A. The distance $D_A$ may be determined from the expression $D_A = c \cdot T_A/2$. For example, if $T_A$ is 1 μs, then the distance $D_A$ to the target 130A is approximately 150 m. Additionally, the operating range $R_{OP}$ in FIG. 20, which is greater than $D_A$, may be approximately 200 m.

Figure 22:
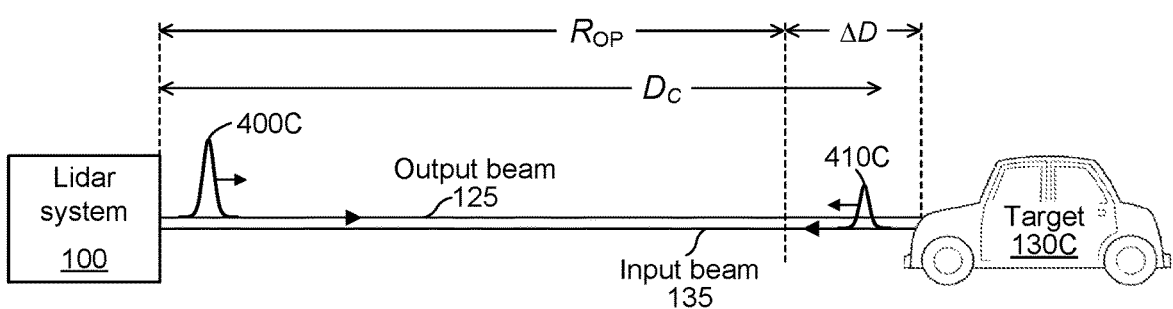
FIG. 22 illustrates an example lidar system and target that is located beyond an operating range ($R_{OP}$) of the lidar system.

FIG. 22 illustrates an example lidar system 100 and target 130C that is located beyond an operating range ($R_{OP}$) of the lidar system 100. The lidar system 100 in FIG. 22 emits an output beam 125 that includes an optical pulse 400C. The optical pulse 400C propagates to a target 130C located a distance $D_C$ from the lidar system, where $D_C$ is greater than the operating range $R_{OP}$. The optical pulse 400C is scattered by the target 130C, and a portion of the scattered light propagates back to the lidar system 100 as input beam 135. The input beam 135 includes optical pulse 410C which includes a portion of the optical pulse 400C emitted by the lidar system 100 and scattered by the target 130C. The lidar system 100 may include a receiver 140 that detects the received optical pulse 410C.

Figure 23:
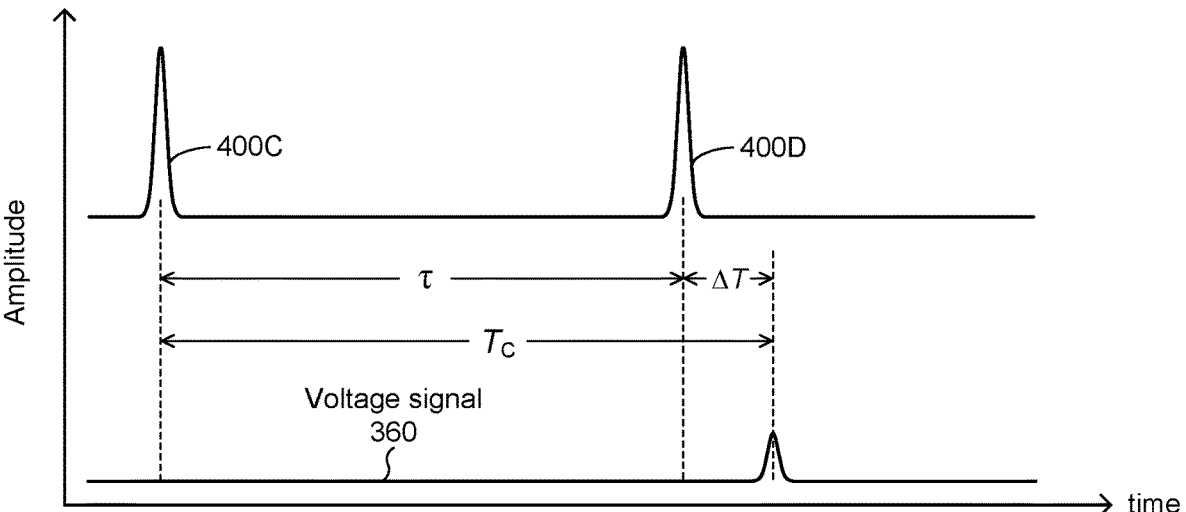
FIG. 23 illustrates example optical pulses emitted by a lidar system, such as in FIG. 22, and a voltage signal corresponding to a received optical signal.

FIG. 23 illustrates example optical pulses 400C and 400D emitted by a lidar system 100, such as in FIG. 22, and a voltage signal 360 corresponding to a received optical signal. The lidar system 100 in FIG. 22 may emit optical pulse 400D a time interval T after optical pulse 400C is emitted. The received optical signal that includes the scattered light from optical pulse 400C is detected by a receiver 140 of lidar system 100, which produces the corresponding voltage signal 360 in FIG. 23. The voltage signal 360 includes an electrical pulse that is produced a time interval $T_C$ after the emission of the optical pulse 400C and that corresponds to receipt of the scattered optical pulse 410C. The receipt of the scattered optical pulse 410C, as indicated by the electrical pulse in the voltage signal 360, occurs a time $\Delta T$ after the optical pulse 400D is emitted.

In particular embodiments, a range-ambiguity event may occur when a distance to a target 130 is greater than an operating range $R_{OP}$ of a lidar system 100. A range-ambiguity event (which may be referred to as range ambiguity or range wrap) refers to a situation where a lidar system 100 may determine an incorrect distance to a target 130 due to an ambiguity as to which emitted optical pulse a received optical pulse is associated with. In FIGS. 20 and 21, the distance $D_A$ to the target 130A may be determined without range ambiguity since $D_A$ is less than the operating range $R_{OP}$. Because the receipt of the optical pulse 410A, as indicated by the electrical pulse in the voltage signal 360 in FIG. 21, occurs prior to the emission of the subsequent optical pulse 400B, the lidar system 100 may not experience range ambiguity. That is, the electrical pulse in FIG. 21 may be unambiguously associated with the emitted optical pulse 400A, and as a result, the distance $D_A$ to the target 130A may be determined without ambiguity.

In FIGS. 22 and 23, a range-ambiguity event may result from the target 130C being located beyond $R_{OP}$, the operating range of the lidar system 100. In FIG. 22, the correct distance to the target 130C may be determined by associating the received optical pulse 410C (as indicated by the pulse in voltage signal 360 in FIG. 23) with the emitted optical pulse 400C. For example, the correct distance to the target 130C may be determined from the expression $D_C=c\cdot T_C/2$ or $D_C=R_{OP}+c\cdot\Delta T/2$. However, if the received optical pulse 410C is incorrectly associated with the subsequently emitted optical pulse 400D, then the lidar system 100 may determine an incorrect distance to the target 130C that is closer than the actual distance $D_C$. The optical pulse 410C scattered by the target 130C is received by the lidar system 100 a time $\Delta T$ after the optical pulse 400D is emitted. As a result, the lidar system may incorrectly associate the received optical pulse 410C (which corresponds to the pulse in voltage signal 360) with the subsequently emitted optical pulse 400D, and the distance from the lidar system 100 to the target 130C may be incorrectly determined to be $\Delta D=c\cdot\Delta T/2$. The correct distance to the target ($D_C$) is larger than the incorrect distance ($\Delta D$) by an amount approximately equal to the operating distance ($R_{OP}$), so that $D_C=\Delta D+R_{OP}$. As an example, if the operating distance $R_{OP}$ is 200 m and the correct distance to the target DC is 250 m, then, due to range ambiguity, the distance to the target may incorrectly be determined to be $\Delta D=50$ m.

In particular embodiments, an operating range $R_{OP}$ of a lidar system 100 may correspond to a distance over which the lidar system 100 is configured to detect scattered light from a target 130 and determine the distance to the target. Additionally, an operating range $R_{OP}$ may correspond to a distance over which a lidar system 100 may determine the distance to a target 130 without range ambiguity. The operating range $R_{OP}$ of a lidar system 100 may be approximately 25 m, 50 m, 100 m, 150 m, 200 m, 250 m, 500 m, 1000 m, or any other suitable distance. For a target 130 located a distance less than $R_{OP}$, a lidar system 100 may determine the distance to the target without range ambiguity. If a target 130 is located a distance greater than $R_{OP}$, a lidar system 100 may experience range ambiguity and may not determine the correct distance to the target. In FIG. 20, the target 130A is located a distance $D_A$ from the lidar system 100, where $D_A$ is less than $R_{OP}$, and the lidar system 100 may determine the distance $D_A$ without range ambiguity. For example, the operating range may be 200 m, and the distance to the target 130A may be determined to be 150 m. In FIG. 22, the target 130C is located a distance $D_C$ from the lidar system 100, where $D_C$ is greater than $R_{OP}$. For example, the operating range may be 200 m, and the distance to the target 130C may be 250 m. In the event of range ambiguity, the lidar system may determine an incorrect distance to the target 130C (e.g., an incorrect distance of 50 m).

In particular embodiments, an operating range $R_{OP}$ of a lidar system 100 may be related to a time $\tau$ between successive pulses by the expression $R_{OP}=c\cdot\tau/2$. For example, if the time between successive pulses is 1.33 µs, then the operating range may be approximately 200 m. If a target 130 is located a distance less than $R_{OP}$, then scattered light from the target may be received by a lidar system 100 before the time $\tau$ has elapsed and before a subsequent pulse is emitted. As a result, the lidar system 100 may determine the distance to the target 130 without range ambiguity. If a target 130 is located beyond the operating range $R_{OP}$, then scattered light from the target 130 may be received after a subsequent pulse is emitted (e.g., after a time interval $\tau$ has elapsed since the previous pulse was emitted). In FIGS. 22 and 23, the lidar system 100 may experience range ambiguity and may not be able to determine whether the received pulse 410C is associated with the previously emitted pulse 400C or the subsequent pulse 400D. For example, pulse 400D may be emitted 1.33 µs after pulse 400C is emitted (corresponding to a 200-m operating range), and the scattered pulse 410C may be received 0.34 µs after pulse 400D is emitted (corresponding to a 250-m distance to target 130C). As a result of range ambiguity, the lidar system 100 may be unable to determine the correct distance to the target 130.

In particular embodiments, a lidar system 100 may be a pulsed lidar system configured to emit multiple optical pulses having one or more of the following optical characteristics: a pulse energy between 0.1 µJ and 100 µJ; a pulse repetition frequency between 80 kHz and 10 MHz; and a pulse duration between 0.1 ns and 50 ns. As an example, one or more of the lidar systems 100 illustrated in FIGS. 1, 3, 6, 20 and 22 may include a light source 110 configured to emit pulses of light having a pulse energy of approximately 0.5-1 µJ, a pulse repetition frequency of approximately 400-800 kHz, and a pulse duration of approximately 2-5 ns. In particular embodiments, a lidar system 100 may be a FMCW lidar system configured to emit multiple optical signals that each include frequency-modulated light. One or more of the lidar systems 100 illustrated in FIGS. 1, 3, 6, 20 and 22 may be configured to operate as a FMCW lidar system.

In particular embodiments, the light source 110 may include a pulsed laser or a pulsed Light Emitting Diode (LED) configured to generate or emit a pulse of light having a pulse duration. In an exemplary embodiment, the pulse duration or pulse width of the pulsed laser is about 10 picoseconds (ps) to 20 nanoseconds (ns). In another embodiment, light source 110 is a pulsed laser that produces pulses having a pulse duration of about 1-4 ns. In yet another embodiment, the light source 110 is a pulsed laser that generates pulses at a pulse repetition rate of about 100 kHz to 5 MHz or a pulse period (e.g., time between successive pulses) of about 200 ns to 10 µs. According to this embodiment, the light source 110 may have a substantially constant, variable, or adjustable pulse repetition frequency. As one example, the light source 110 may be a pulsed laser that generates pulses at a substantially constant pulse repetition frequency (corresponding to a pulse period of about 1.56µβ) of about 640 kHz (e.g., 640,000 pulses per second). As another example, the pulse repetition frequency of the light source 110 may vary between about 500 kHz to 3 MHz. As used herein, light pulses may be referred to as optical pulses, pulsed light or pulses, and the pulse repetition frequency may be referred to as the pulse rate.

In certain circumstances, a controller 205 in a pulsed lidar system may decrease the rotation rate of a polygon mirror 310. The slowed rotation rate of the polygon mirror 310 may increase the operating range ($R_{OP}$) of the lidar system 100, but in doing so could introduce range ambiguity as described with respect to FIGS. 22 and 23. A controller 205 in such lidar system 100 may be configured to decrease the pulse repetition frequency of the light source 110 in conjunction with a decrease in the rotation rate of the polygon mirror 310 in order to mitigation such range ambiguity. See also FIGS. 14-16 and the related discussion. In some embodiments, a pulse repetition frequency may be changed approximately proportionally to a change in polygon rotation rate. Any suitable pulse repetition frequency may be used, for example 100 kHz, 500 kHz, or 10,000 kHz.

Figure 24:
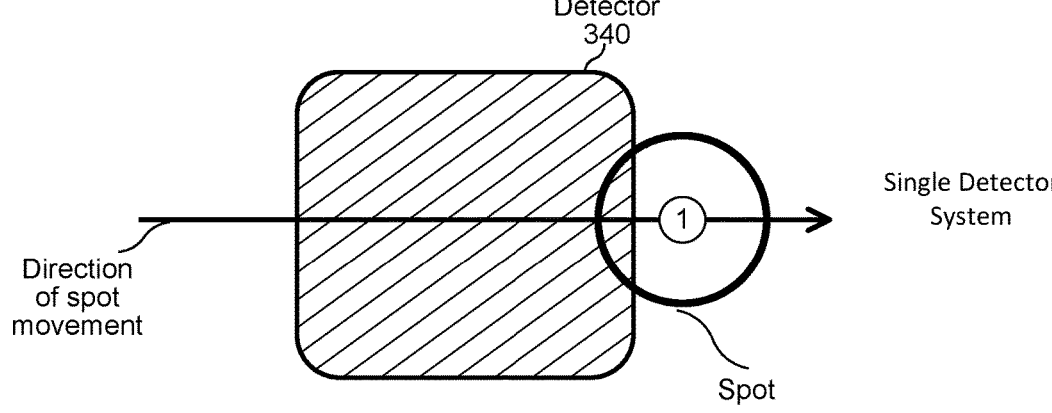
FIG. 24 illustrates an example spot of light received from a target that is located beyond an operating range ($R_{OP}$) of the lidar system, superimposed onto an example detector.

FIG. 24 illustrates an example spot of light received from a target 130 that is located beyond an operating range ($R_{OP}$) of the lidar system 100, superimposed onto an example detector 340. As an example, where the distance to target 130 equals or exceeds the operating range ($R_{OP}$) of the lidar system 100, only a small part of the scattered light received from target 130 lands on the detector 340. This part may be any reasonable portion of the scattered light, for example 1%, 10%, 20%, or 50%.

FIG. 25 illustrates an example receiver with two detectors. The two detectors may function similarly to those discussed with respect to FIG. 12.

In particular embodiments, a lidar system 100 may include a scanner 120 configured to (1) scan an output beam 125 in a scan direction across a field of regard of the lidar system 100 and (2) scan a field of view of a receiver 140 in the same scan direction across the field of regard of the lidar system 100. The output beam 125 may include optical signals (e.g., pulses of light) emitted by a light source 110 of the lidar system, and the receiver 140 may detect light from the output beam 125 that is scattered toward the lidar system 100 from the direction of the receiver FOV. Light that propagates back to the receiver 140 from the receiver FOV is focused by the lens 330 onto the detectors 340-1 and 340-2. The focused light forms a spot or image that moves (in the direction of spot movement) across the detectors 340-1 and 340-2 as the receiver FOV is scanned.

In particular embodiments, a light source 110 may emit an optical pulse, and a portion of the optical pulse scattered by a target 130 may be directed to a receiver 140 and focused to a spot onto detectors 340-1 and 340-2. The received optical pulse may be directed to the detectors 340-1 and 340-2 so that a first portion of the received optical pulse is detected by detector 340-1 and a second portion of the received optical pulse is detected by detector 340-2. The first and second portions may each have an amount of optical power or energy that depends at least in part on the distance from the lidar system 100 to the target 130. For example, for a nearby target 130, the first portion of the received optical pulse may have a larger energy or peak power than the second portion. Additionally, for a target 130 located beyond an operating range of the lidar system 100, the first portion of the received optical pulse may have a lower energy or peak power than the second portion.

FIG. 26 illustrates four example spots of light received from a fixed distance target 130, superimposed onto two example detectors 340-1 and 340-2. The two detectors 340-1 and 340-2 may be part of a receiver 140 similar to that illustrated in FIG. 25, and the four beam spots (Spot-1, Spot-2, Spot-3, and Spot-4) are located at four different positions relative to the two detectors 340-1 and 340-2. The four spots represent received light scattered from a calibration target 130 located at a fixed distance from a lidar system 100. The size or location of each of the spots may depend on how far the corresponding target 130 is located from the lidar system 100. The spots may move across the detectors 340-1 and 340-2 in the direction of spot movement (e.g., from left to right in FIG. 26) in relation to the corresponding rotation rate of the polygon mirror 301 as the rotation rate is increased. For example, Spot-1 may represent a spot of scattered light received from target 130 at a slower polygon rotation rate (e.g., a rotation rate of 3,000 RPM), and Spot-4 may represent a spot of scattered light received from target 130 at a relatively fast rotation rate (e.g., a rotation rate of 6,000 RPM). Spot-2 and Spot-3 may each represent scattered light received from target 130 at an intermediate polygon mirror rotation rate (e.g., a rotation rate between 6,000 and 8,000 RPM).

The amount of photocurrent produced by each of the detectors 340-1 and 340-2 in response to receiving light associated with a particular spot may depend at least in part on the size of the spot and its location on the detectors.

In particular embodiments, one or more detectors 340 of a receiver 140 may be arranged along a line corresponding to a scan direction of a field of view of the receiver 140. In FIG. 25, the direction of the spot movement across the detectors 340-1 and 340-2 corresponds to the scan direction of the receiver FOV, albeit in the opposite direction. As the receiver FOV scans in an upward scan direction, the focused light spot moves across the detectors 340-1 and 340-2 in a downward direction that is parallel to the scan direction. In FIG. 26, the focused light spots move across the detectors 340-1 and 340-2 from left to right, and the detectors 340-1 and 340-2 are oriented side-by-side along the line corresponding to the direction of spot movement. The line corresponding to the direction of spot movement may be approximately parallel to the line corresponding to the scan direction of the receiver FOV. Additionally, the scan direction of the receiver FOV imaged onto the detectors 340-1 and 340-2 may correspond to the direction of spot movement across the detectors.

In certain embodiments, a calibration target 130 may be located a fixed distance from a lidar system 100 having a controller 205 that is capable of providing a control signal to increase the rotation rate of the polygon mirror 301. In this way, the lidar system 100 could simulate a virtual target located farther from the lidar system 100 than calibration target 130 is located. For example, the controller 205 may send such a signal in order to calibrate a portion of a second detector 340-2 that would not have been as activated by light reflected from calibration target 130 at the previous rotation rate.

FIG. 27 illustrates example signals produced by the detectors of FIG. 26 as a function of polygon rotation speed. The curves in FIG. 27 may correspond to the amplitude of a signal (e.g., photocurrent) produced by each detector in response to an input light signal 135, where the input light signal 135 includes light from an output light signal 125 that is scattered by a target 130 located a particular distance from the lidar system 100. The signal produced by detector 340-1 (represented by a solid line) is relatively large for slower polygon mirror rotation rates and then drops as the rotation rate increases. The signal produced by detector 340-2 (represented by a dashed line) varies for slow and intermediate rotation rates and then drops as the rotation rate increases to the point that the received scattered light moves beyond detector 340-2. In FIG. 27, the values on the y-axis may correspond to the optical characteristics of the optical signals detected by each of the detectors 340-1 and 340-2. For example, at Spot-3, the two detectors may detect optical signals that have approximately the same optical power or energy. At Spot-2, the portion of the optical signal detected by detector 340-1 may have approximately 100 times more optical power or energy than the portion of the optical signal detected by detector 340-2. At Spot-4, the portion of the optical signal detected by detector 340-1 may have approximately 100 times less optical power or energy than the portion of the optical signal detected by detector 340-2.

The circled numbers 1, 2, 3, and 4 in FIG. 27 represent the corresponding beam spots in FIG. 26. Spot-1 may correspond to light scattered from a target 130 where the polygon mirror rotation rate of the lidar system 100 is relatively slow. For polygon mirror rotation rates slower than the rotation rate corresponding to Spot-3, the photocurrent produced by detector 340-1 may be greater than the photocurrent produced by detector 340-2. For rotation rates faster than the rotation rate corresponding to Spot-3, the detector 340-1 photocurrent may be less than the detector 340-2 photocurrent. As an example, at rotation rates near the rotation rate corresponding to Spot-3, the photocurrent of the two detectors is roughly similar.

The operating range of lidar system 100 may be limited based on when a beam spot goes beyond where detectors 340-1 and 340-2 may adequately sense, for example at a distance beyond the target 130 corresponding to Spot-4. In certain embodiments, the operating range of a pulsed lidar system 100 may also be limited by the pulse repetition frequency and its impact on range ambiguity. Where a pulse repetition rate is controlled by controller 250 such that range ambiguity is avoided, the point at which return signals go beyond detectors 340-1 and 340-2 may limit the operating range of lidar system 100.

In certain embodiments, by modifying the rotation rate of the polygon mirror 301, lidar system 100 may control at what distance to target 130 a beam spot returning from target 130 will go beyond where the detectors 340-1 and 340-2 may adequately sense. This may establish the maximum operating range of lidar system 100. As an example, if a lidar system 100 typically may only adequately sense signals returning from targets located within a 200 m range, then by decreasing the polygon rotation rate lidar system 100 may be able to sense signals returning from targets located within a 300 m range. As such, the polygon rotation rate change effectively may alter an operating range of lidar system 100. As another example, the operating range of lidar system 100 may be reduced from 300 m to 150 m by increasing the polygon rotation rate of the lidar system 100.

In particular embodiments, a receiver 140 may include a near-range detector and a far-range detector. For input light 135 scattered from a target located a distance less than a near-range distance of a lidar system 100, the near-range detector may produce a larger response than the far-range detector. Similarly, for light scattered from a target located beyond the near-range distance, the far-range detector may produce a larger response than the near-range detector. In the example of FIGS. 25 and 26, detector 340-1 may be referred to as a near-range detector, and detector 340-2 may be referred to as a far-range detector. Additionally, the cross-over point at Spot-3 in FIG. 27 may correspond to a target 130 located a distance from the lidar system 100 approximately equal to the near-range distance. For a target 130 located closer than the near-range distance, detector 340-1 (e.g., the near-range detector) may produce a larger response than detector 340-2 (e.g., the far-range detector). Similarly, for a target 130 located beyond the near-range distance, detector 340-2 may produce a larger response than detector 340-1. The near-range distance may be a distance of approximately 50 m, 100 m, 150 m, 200 m, 250 m, 500 m, or any other suitable distance.

In particular embodiments, a near-range distance may be approximately equal to an operating range of a lidar system 100. For example, a lidar system 100 may have a 200-m operating range, and the near-range distance (corresponding to the cross-over point between the detector 340-1 and 340-2 signals) may be approximately equal to 200 m. In particular embodiments, a near-range distance may be greater than or less than an operating range of a lidar system 100. For example, a lidar system 100 may have a 200-m operating range, and the near-range distance may be approximately 150 m so that the near-range distance is less than the operating range.

In particular embodiments, a variation in detector response with distance to a target 130 or polygon mirror 301 rotation rate may be provided, at least in part, by a scanner 120 of a lidar system 100. For example, a scanner 120 may scan the receiver FOV so that the size and location of the spot of received light on the detectors 340-1 and 340-2 changes with distance to the target 130. Additionally, the detectors 340-1 and 340-2 may be positioned so that the spot of received light moves from detector 340-1 to detector 340-2 as the distance to the target 130 increases.

As another example, a scanner 120 may scan the receiver FOV so that at least the location of the spot of received light on the detectors 340-1 and 340-2 changes with polygon mirror rotation rate. Additionally, the detectors 340-1 and 340-2 may be positioned so that the spot of received light moves from detector 340-1 to detector 340-2 as the polygon rotation rate increases. For slower polygon rotation rates, given a certain distance to target 130, the received spot of light may be directed substantially toward or near detector 340-1 so that detector 340-1 produces a larger response than detector 340-2. For faster polygon rotation rates, at the same distance to target 130, the received spot of light may be directed substantially toward or near detector 340-2 so that detector 340-2 produces a larger response than detector 340-1. A controller 250 may cause a scanner 120 to adjust the polygon rotation rate to cause certain effects, such as changing the operating range, or calibrating the receiver 140, of a lidar system 100.

Figure 28:
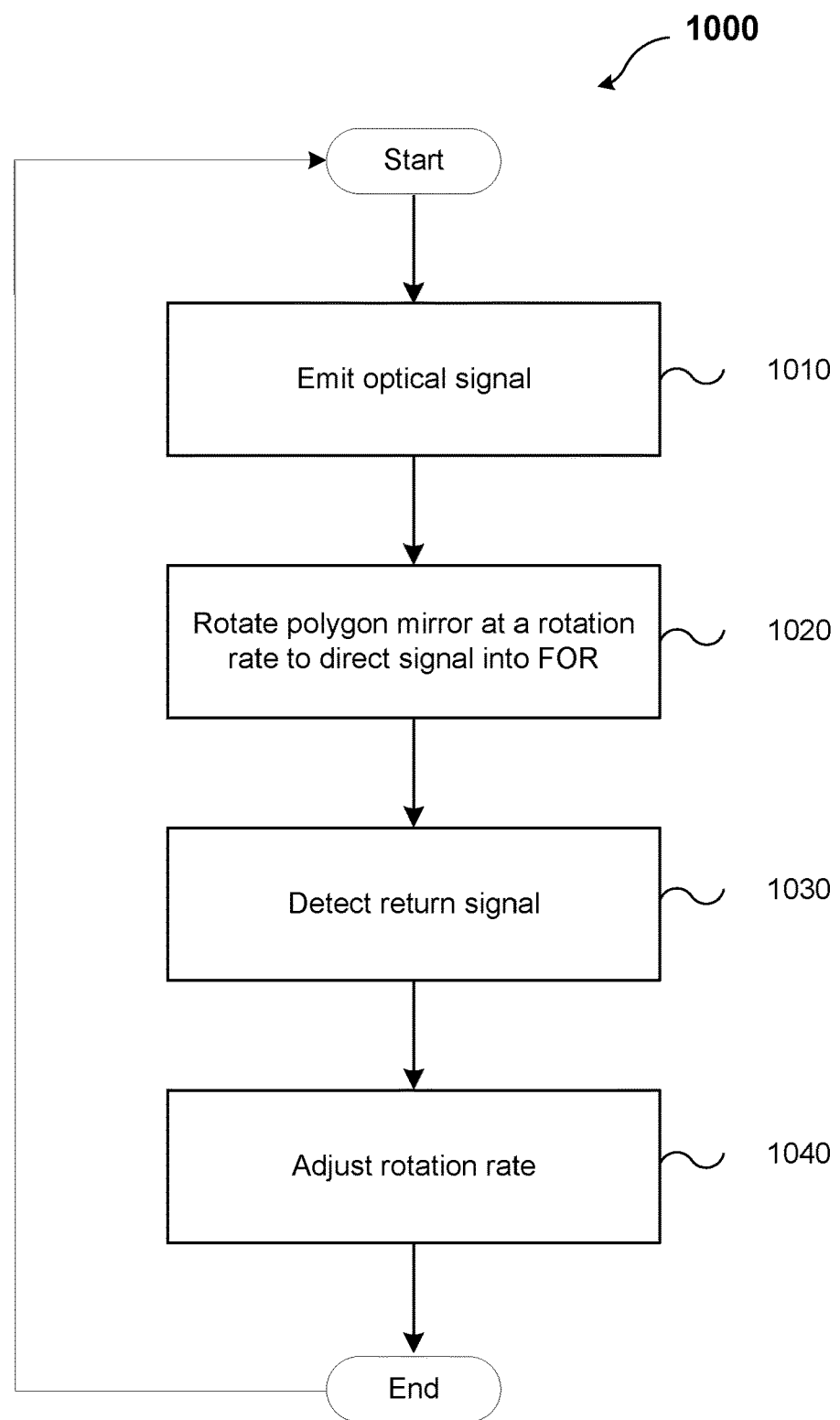
FIG. 28 illustrates an example method for adjusting the rotation rate of a polygon mirror in a lidar system.

FIG. 28 illustrates an example method 1000 for adjusting the rotation rate of a polygon mirror 310 in a lidar system 101. The method may begin at step 1010, where the light source 110 of a lidar system 101 emits one or more optical signals. At step 1020, controller 250 signals motor 56 to rotate the polygon mirror 310 at a specified rotation rate around its axis of rotation 274, in order to direct an emitted signal into a field of regard of the lidar system 101. At step 1030, lidar system 101 may detect a return signal at a receiver 140, some of which may include a portion of an emitted signal after being scattered by a target 130 in the field of regard located a distance from lidar system 101. At step 1040, controller 250 may send a signal to motor 56 to adjust the rotation rate of the polygon mirror 310 for one or more subsequently emitted optical signals, at which point the method may end, or begin again at the first step.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of a computer system. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 μs, 10 μs, or 1 μs. The term "substantially constant" may be applied to any suitable value, such as for example, an optical power, a pulse repetition frequency, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
a light source configured to emit a first set of optical signals comprising a first optical signal;

a scanner comprising a polygon mirror configured to:
rotate around an axis of rotation at a rotation rate; and
direct the first set of emitted optical signals into a field of regard of the lidar system with the polygon mirror rotating at a first rotation rate;
a receiver configured to detect a first received optical signal comprising a portion of the first optical signal that is scattered by a target located a distance from the lidar system; and
a controller configured to adjust the rotation rate of the polygon mirror for a second set of optical signals emitted by the light source subsequent to the first set of optical signals, wherein the controller is configured to adjust the rotation rate at least in part to calibrate the receiver.

2. The lidar system of claim 1, wherein the polygon mirror includes a plurality of reflective surfaces angularly offset from one another along a periphery of the polygon mirror.

3. The lidar system of claim 1, wherein the receiver is further configured to detect a second received optical signal comprising a portion of the second optical signal scattered by the target, and wherein the second received optical signal impinges on the receiver at a different location than the first received optical signal.

4. The lidar system of claim 1, wherein:
the receiver comprises a detector configured to detect the first received optical signal and produce an electrical signal corresponding to the first received optical signal;
the target is a calibration target located a fixed distance from the lidar system;
the controller is configured to adjust the rotation rate of the polygon mirror for the second set of optical signals to a second rotation rate different from the first rotation rate;
the second set of optical signals is emitted by the light source subsequent to the controller adjusting the rotation rate of the polygon mirror to the second rotation rate;
the second set of optical signals comprises a second optical signal; and
the receiver is further configured to detect a second received optical signal comprising a portion of the second optical signal scattered by the calibration target.

5. The lidar system of claim 4, wherein the second received optical signal impinges on the detector at a different location than the first received optical signal.

6. The lidar system of claim 5, wherein:
the second rotation rate is greater than the first rotation rate; and
the second received optical signal impinges on the detector farther along in a direction of spot movement, thereby simulating a virtual target farther from the lidar system than the calibration target located the fixed distance from the lidar system.

7. The lidar system of claim 1, wherein:
the receiver comprises a detector configured to detect the first received optical signal and produce an electrical signal corresponding to the first received optical signal;
the light source is further configured to emit the first set of optical signals with an amount of power;
the target is a calibration target having a known reflectivity value;
the receiver is further configured to determine an actual amplitude of the first received optical signal based at least in part on the electrical signal produced by the detector; and
the controller is further configured to:

determine an expected amplitude of the first received optical signal based at least in part on the amount of power, the known reflectivity value, and the distance to the target; and determine a correction factor for the detector based at least in part on a disparity between the expected amplitude and the actual amplitude.

8. The lidar system of claim 7, wherein the controller is further configured to adjust the rotation rate of the polygon mirror to obtain a plurality of correction factors for the detector.

9. The lidar system of claim 7, wherein:

the detector is a first detector;

the receiver further comprises one or more additional detectors; and the controller is further configured to obtain a correction factor for one or more of the first detector and additional detectors.

10. The lidar system of claim 1, wherein:

increasing the rotation rate decreases an operating range of the lidar system; and decreasing the rotation rate increases the operating range of the lidar system.

11. The lidar system of claim 10, wherein:

the rotation rate of the polygon mirror for the second set of optical signals is a second rotation rate that is greater than the first rotation rate; and an operating range of the lidar system for the first set of optical signals is greater than an operating range of the lidar system for the second set of optical signals.

12. The lidar system of claim 11, wherein the controller is further configured to adjust a pulse repetition frequency of the optical signals emitted by the light source based at least in part on the rotation rate of the polygon mirror, wherein a pulse repetition frequency of the second set of optical signals is greater than a pulse repetition frequency of the first set of optical signals.

13. The lidar system of claim 10, wherein:

the receiver comprises a detector configured to detect the first received optical signal and produce an electrical signal corresponding to the first received optical signal;

less than 20% of the first received optical signal impinges on the detector; and the distance to the target is greater than or equal to an operating range of the lidar system for the first set of optical signals.

14. The lidar system of claim 10, wherein:

the lidar system is a pulsed lidar system;

the optical signals comprise pulses of light wherein the pulses of light are emitted with a particular pulse repetition frequency; and the controller is further configured to decrease the pulse repetition frequency of the light source based at least in part on a decreased rotation rate of the polygon mirror.

15. The lidar system of claim 1, wherein the receiver comprises a first detector and a second detector, each detector configured to detect the first received optical signal and produce an electrical signal corresponding to the first received optical signal.

16. The lidar system of claim 15, wherein the controller is further configured to provide a control signal to the polygon mirror to adjust the rotation rate at least in part to identify a rotation rate at which electrical signals from the first and second detectors in response to a subsequent received optical signal are approximately equal.

17. The lidar system of claim 15, wherein:

the target is a calibration target located a fixed distance from the lidar system; and the controller is further configured to provide a control signal to increase the rotation rate of the polygon mirror to simulate a virtual target at a farther distance from the lidar system than the fixed distance of the calibration target in order to calibrate a portion of the second detector.

18. The lidar system of claim 1, wherein:

the polygon mirror is configured to scan the first set of emitted optical signals along a first direction; and the scanner further comprises a second mirror configured to scan the first set of optical signals along a second direction different from the first direction.

19. The lidar system of claim 1, wherein the light source comprises:

a seed laser diode configured to produce a seed optical signal; and a semiconductor optical amplifier (SOA) configured to amplify the seed optical signal to produce the emitted first optical signal.

20. A method comprising:

emitting, by a light source of a lidar system, a first set of optical signals comprising a first optical signal;

rotating a polygon mirror around an axis of rotation at a rotation rate;

directing, by the polygon mirror, the first set of emitted optical signals into a field of regard of the lidar system with the polygon rotating at a first rotation rate;

detecting, by a receiver, a first received optical signal comprising a portion of the first optical signal that is scattered by a target located a distance from the lidar system; and adjusting, by a controller, the rotation rate of the polygon mirror for a second set of optical signals emitted by the light source subsequent to the first set of optical signals, wherein the adjusting the rotation rate is performed at least in part to calibrate the receiver.

\* \* \* \* \*